(12) United States Patent
Patil et al.

(10) Patent No.: US 10,403,141 B2
(45) Date of Patent: Sep. 3, 2019

(54) SYSTEM AND METHOD FOR PROCESSING TRAFFIC SOUND DATA TO PROVIDE DRIVER ASSISTANCE

(71) Applicant: SONY CORPORATION, Tokyo (JP)

(72) Inventors: Sharanappagouda Linganagouda Patil, Bangalore (IN); Kaneaki Fujishita, Bangalore (IN); Yukio Takeyari, Bangalore (IN)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 15/241,347

(22) Filed: Aug. 19, 2016

(65) Prior Publication Data

US 2018/0053413 A1 Feb. 22, 2018

(51) Int. Cl.
| | | |
|---|---|---|
| *G08G 1/16* | (2006.01) |
| *G01S 11/14* | (2006.01) |
| *G08G 1/0965* | (2006.01) |
| *G08G 1/0968* | (2006.01) |
| *G08G 1/0969* | (2006.01) |

(52) U.S. Cl.
CPC ............ *G08G 1/0968* (2013.01); *G01S 11/14* (2013.01); *G08G 1/0965* (2013.01); *G08G 1/0969* (2013.01); *G08G 1/16* (2013.01); *G08G 1/166* (2013.01); *B60K 2350/1096* (2013.01)

(58) Field of Classification Search
CPC ......... G08G 1/0968; G08G 1/16; G08S 11/14
USPC .................. 701/119; 340/988–996, 435, 903
See application file for complete search history.

(56) References Cited

U.S. PATENT DOCUMENTS 5,450,057 A * 9/1995 Watanabe ................ B60Q 9/00
                                                                                         180/169
5,979,586 A     11/1999 Farmer et al.
(Continued)

FOREIGN PATENT DOCUMENTS

| EP | 1312499 A2 | 5/2003 |
| JP | 11-48886 A | 2/1999 |

(Continued)

OTHER PUBLICATIONS

Mitsunori Mizumachi et al, "Robust Sensing of Approaching Vehicles Relying on Acoustic Cues", Sensors, May 30, 2014, pp. 9546-9561, ISSN 1424-8220.

(Continued)

*Primary Examiner* — Krishnan Ramesh
(74) *Attorney, Agent, or Firm* — Chip Law Group

(57) ABSTRACT

Various aspects of a system and method to process traffic sound data to provide in-vehicle driver assistance are disclosed herein. The system includes one or more circuits in an electronic control unit (ECU) of a first vehicle. The one or more circuits in the ECU are configured to receive sound data captured by two or more audio-input devices associated with the first vehicle. The sound data corresponds to sound emanated from one or more other vehicles. Thereafter, a relative position (distance and/or angle) of the first vehicle from a second vehicle of the one or more other vehicles is determined based on the received sound data. Further, an in-vehicle alert is generated for the first vehicle based on the determined relative position. The in-vehicle alert comprises a virtual sound representative of sound emanated from the second vehicle.

20 Claims, 15 Drawing Sheets

(56) References Cited

U.S. PATENT DOCUMENTS

| | | | | |
|---|---|---|---|---|
| 6,449,540 | B1* | 9/2002 | Rayner | B60R 1/00 340/901 |
| 6,844,826 | B2* | 1/2005 | Yurimoto | G08G 1/161 340/435 |
| 7,741,962 | B2* | 6/2010 | Kalik | G01S 13/931 340/435 |
| 8,362,890 | B2* | 1/2013 | Takeichi | G01S 7/527 180/167 |
| 8,682,004 | B2* | 3/2014 | Grigsby | G08G 1/0962 340/435 |
| 8,798,905 | B2* | 8/2014 | Yoshioka | G01S 3/8083 340/435 |
| 9,840,254 | B2* | 12/2017 | Gupta | B60W 30/18 |
| 2003/0141967 | A1* | 7/2003 | Aichi | B60Q 9/00 340/435 |
| 2013/0222127 | A1 | 8/2013 | Ray Avalani | |
| 2015/0203031 | A1* | 7/2015 | Arita | B60Q 5/008 340/903 |
| 2015/0319608 | A1* | 11/2015 | Varughese | H04W 4/046 455/456.4 |
| 2015/0365743 | A1 | 12/2015 | Konigsberg et al. | |
| 2017/0032402 | A1* | 2/2017 | Patsiokas | G06Q 30/0266 |
| 2017/0251324 | A1* | 8/2017 | Stelandre | H04S 7/303 |

FOREIGN PATENT DOCUMENTS

| | | |
|---|---|---|
| JP | 2001-001851 A | 1/2001 |
| JP | 2005-301751 A | 10/2005 |
| JP | 2008-191742 A | 8/2008 |
| JP | 2009-051333 A | 3/2009 |
| JP | 5516455 B2 | 6/2014 |
| WO | 2011/001684 A1 | 1/2011 |
| WO | 2012/115205 A1 | 8/2012 |

OTHER PUBLICATIONS

Loz Blain, "Carvi Brings Modern Driver Assist Technology to Older Cars", Gizmag, Feb. 8, 2015, p. 5 Available at: http://www.gizmag.com/carvi-driver-assist-retrofit/35985/.

Bill Howard, "GMC Adds in Low-Cost Collision Warning by Using a CAM Instead of Radar", Extreme Tech, Dec. 23, 2011, p. 6 Available at: http://www.extremetech.com/extreme/110371-gmc-terrain-low-cost-collision-warning.

"Dynamic Radar Cruise Control (DRCC)", Toyota, Retrived on Apr. 13, 2016, p. 3 Available at: http://www.toyota-global.com/innovation/safety_technology/safety_technology/technology_file/active/radar.html.

Brightway Vision TM, "Brighteye", A-Sample Technical Data, Apr. 2014, p. 2.

Niko, "Thinkware F550 Dual Channel", Complete Review 2CH Thinkware F550/FXD900 1080P Sony CMOS + 720P (BCH-300). GPS Logger. 24/7 Parking, Dec. 13, 2014, p. 31 Available at: https://dashcamtalk.com/forum/threads/complete-review-2ch-thinkware-f550-fxd900-1080p-sony-cmos-720p-bch-300-gps-logger-24-7-parking.8709/.

Extended European Search Report of EP Patent Application No. 171860860.4, dated Apr. 16, 2018, 12 pages.

Office Action for JP Patent Application No. 2017-157001, dated Jun. 6, 2018, 03 pages of Office Action and 03 pages of English Translation.

Office Action for KR Patent Application No. 10-2017-0101094, dated Dec. 4, 2018, 06 pages of Office Action and 07 pages of English Translation.

* cited by examiner

SYSTEM AND METHOD FOR PROCESSING TRAFFIC SOUND DATA TO PROVIDE DRIVER ASSISTANCE

CROSS-REFERENCE TO RELATED APPLICATIONS/INCORPORATION BY REFERENCE

None.

FIELD

Various embodiments of the disclosure relate to audio processing. More specifically, various embodiments of the disclosure relate to a system and method for processing of traffic sound data for driving assistance.

BACKGROUND

Driving a vehicle may be a cumbersome and difficult task for a significant section of the population. A constant focus may be required to drive on a traffic situation on a road and to adhere to traffic rules, such as driving in proper lanes, keeping to speed limits, and risk-free overtaking. In addition, there may be a significant risk to life and property in case of road accidents. In fact, several road accident surveys across various geographies and time periods have revealed that number of deaths and injuries in road accidents is alarmingly high. Thus, safety on the roads may be of paramount importance to vehicle manufacturers, vehicle owners, passengers, and drivers. With the development of automobile and allied industries, several products have been developed, which may be installed in the vehicles to guide vehicle drivers to drive cautiously. However, there are many occasions where the driver may ignore or miss the guidance or the provided guidance may be inaccurate or cluttered to follow. Hence, there is need for an improved system and method to provide effective in-vehicle driver assistance. In addition, recently there has been rapid development in the field of driver-less autonomous vehicles. Such autonomous vehicles may also benefit from an improved driving assistance method and system.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to process traffic sound data for driving assistance, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
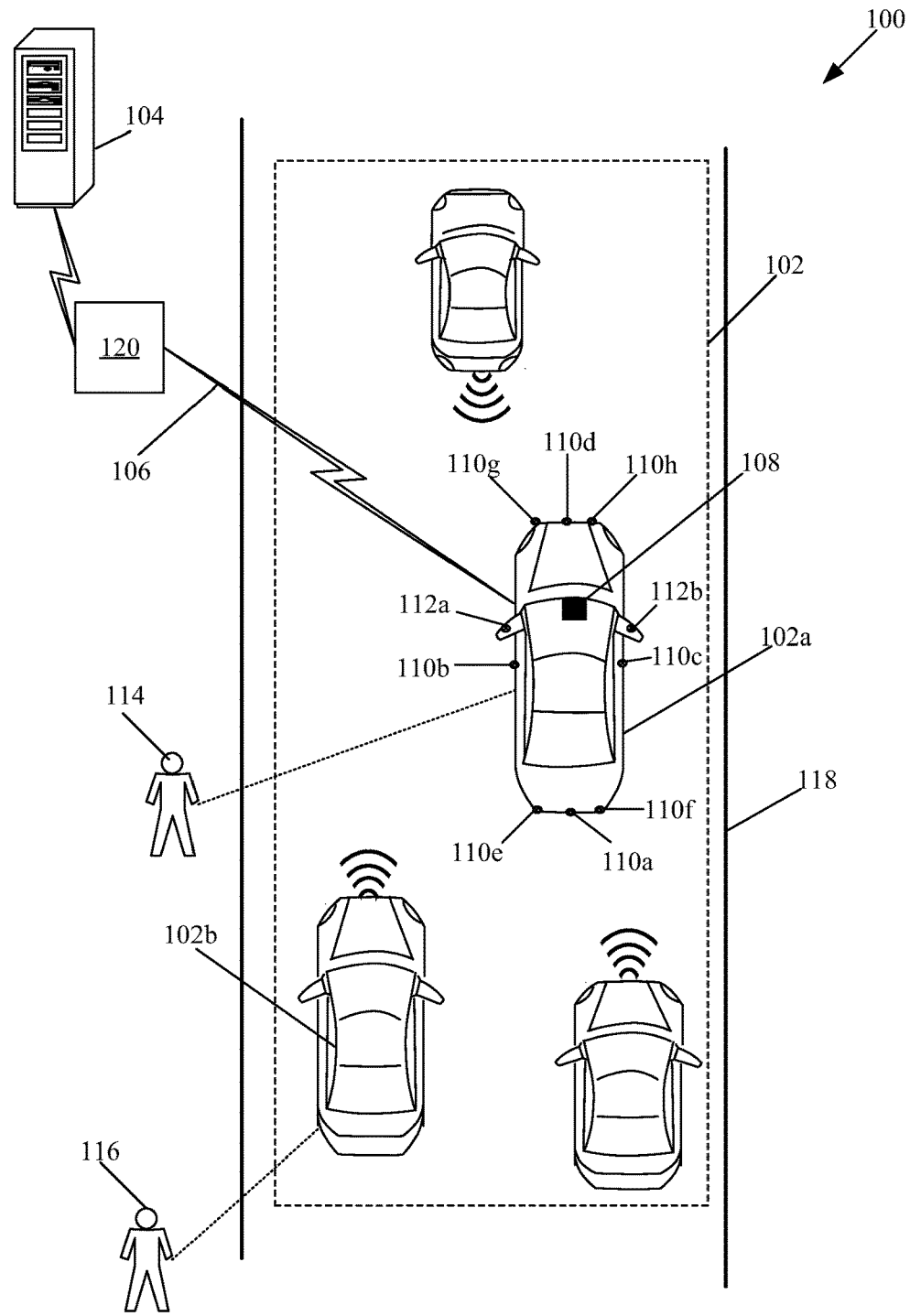
FIG. 1 is a block diagram that illustrates a network environment to process traffic sound data to provide in-vehicle driver assistance, in accordance with an embodiment of the disclosure.

The following described implementations may be found in the disclosed system and method to provide in-vehicle driver assistance. Exemplary aspects of the disclosure may comprise a method that may be implemented in an electronic control unit (ECU) of a first vehicle. The method may include receipt of sound data captured by two or more audio-input devices associated with the first vehicle. The sound data may correspond to sound emanated from one or more other vehicles. Thereafter, a distance of the first vehicle from a second vehicle of the one or more other vehicles may be determined based on the received sound data. Further, an in-vehicle alert may be generated for the first vehicle based on the determined distance. The in-vehicle alert may comprise a virtual sound representative of sound emanated from the second vehicle.

In accordance with an embodiment, the first vehicle may include a first set of audio-output devices and a second set of audio-output devices. The first set of audio-output devices may be associated with a driver of the first vehicle, whereas the second set of audio-output devices may be associated with the driver and one or more co-passengers of the first vehicle. In accordance with an embodiment, the in-vehicle alert may be reproduced via the first set of audio-output devices for the driver of the first vehicle. In accordance with an embodiment, the in-vehicle alert may additionally or alternatively be reproduced via the second set of audio-output devices based on a traffic situation associated with a travel path of the first vehicle. Examples of the in-vehicle alert may further include, but not limited to, an accident warning, a driving-maneuver instruction, a speed-change recommendation, a vehicle-overtake recommendation, a lane-change recommendation, driving-condition information, an obstacle warning, and/or a selected vehicle tracking In accordance with an embodiment, to reproduce the virtual sound in the first vehicle, a relative position and/or an angle of the second vehicle with respect to the first vehicle may be determined. The determination of the relative position and/or the angle may be based on the received sound data. Further, a Head-Related Transfer Function (HRTF) may be applied based on the determined distance and/or the angle for the reproduction of the virtual sound representative of the sound emanated from the second vehicle.

In accordance with an embodiment, a type of the second vehicle may be determined based on a comparison of a pre-stored audio signature(s) associated with the second vehicle and the sound emanated from the second vehicle. In accordance with an embodiment, the virtual sound of the in-vehicle alert may be reproduced in accordance with the determined type of the second vehicle. Further, the virtual sound may be reproduced when the determined distance between the first vehicle and the second vehicle is less than a pre-specified threshold distance.

In accordance with an embodiment, speed of the one or more other vehicles may be determined based on the captured sound emanated from the one or more other vehicle. In addition, a relative velocity of the second vehicle with respect to the first vehicle may be determined based on the sound emanated from the second vehicle. In accordance with an embodiment, an audio warning may be generated for the driver of the first vehicle, along with the virtual sound, based on the determined distance and/or the relative velocity.

In accordance with an embodiment, one or more image-capturing devices associated with the first vehicle may capture one or more images that may comprise the one or more objects in a travel path of the first vehicle. The one or more objects, such as human beings, an animal, or other objects, may be recognized based on the one or more images captured by the one or more image-capturing devices associated with the first vehicle. Further, a distance of the one or more objects from the first vehicle may be determined based on the captured one or more images. In accordance with an embodiment, the in-vehicle alert may further include a second audio-output indicative of a presence of the one or more objects in the travel path within a pre-specified distance from the first vehicle.

In accordance with an embodiment, display of a virtual object via an infotainment system of the first vehicle may be controlled, based on the captured one or more images. The virtual object may be representative of the recognized one or more objects present in the travel path of the first vehicle. In accordance with an embodiment, the in-vehicle alert may include an indication of such recognized one or more objects present in the travel path of the first vehicle. In accordance with an embodiment, at least the second vehicle may be displayed on a map via the infotainment system of the first vehicle. The display of the second vehicle on the map may be controlled based on the captured one or more images and the determined distance between the first vehicle and the second vehicle. The determined distance between the first vehicle and the second vehicle may include the relative position and/or the angle of the first vehicle with respect to the second vehicle. In accordance with an embodiment, a user of the infotainment system may select a specific vehicle that is to be tracked by one or more sensors of the first vehicle, such as audio capture devices and image capture devices. The user of the infotainment system may either be the driver of the first vehicle or one of the one or more co-passengers of the first vehicle. The relative position of the user-selected specific vehicle may be tracked with respect to the first vehicle based on an audio and/or one or more images captured from the user-selected specific vehicle by the one or more sensors of the first vehicle. Thereafter, the tracked relative position of the user-selected specific vehicle may be provided to the user through the in-vehicle alert and/or displayed on the map via the infotainment system of the first vehicle.

In accordance with an embodiment, information that may correspond to a traffic condition associated with the travel path of the first vehicle may be transmitted to a traffic management server and/or an electronic device of a user. The transmission of the traffic condition information may be based on the determined distance, the relative velocity, and/or the type of the second vehicle. The transmission of the traffic condition information may be further based on a count of the one or more other vehicles within a pre-determined distance from the first vehicle.

FIG. 1 is a diagram that illustrates a network environment to process traffic sound data to provide in-vehicle driver assistance, in accordance with an embodiment of the disclosure. With reference to FIG. 1, there is shown a network environment 100. The network environment 100 may include a plurality of vehicles 102, a cloud server 104, a wireless communication network 106, and one or more users. The plurality of vehicles 102 may include a first vehicle 102a and one or more other vehicles, such as a second vehicle 102b. There is further shown an electronic control unit (ECU) 108, two or more audio-input devices 110a to 110h, image-capturing devices 112a to 112b in the first vehicle 102a. The one or more users may include a driver 114 associated with the first vehicle 102a, and another driver 116 associated with the second vehicle 102b. The plurality of vehicles 102 may traverse along a road portion 118. There is further shown a road side unit (RSU) 120.

The ECU 108 may be communicatively coupled to the two or more audio-input devices 110a to 110h and the one or more image-capturing devices 112a to 112b, directly or indirectly via an in-vehicle network of the first vehicle 102a. In accordance with an embodiment, the ECU 108 may be communicatively coupled to the RSU 120, via the wireless communication network 106. The RSU 120 may communicate with the cloud server 104 via the Internet or a suitable communication protocol known in the art. The ECU 108 may be configured to communicate with the cloud server 104 by use of the RSU 120. In accordance with an embodiment, the one or more image-capturing devices 112a to 112b may not be provided in the first vehicle 102a.

The plurality of vehicles 102 may include the first vehicle 102a, the second vehicle 102b, and other vehicles that may traverse along the road portion 118. In accordance with an embodiment, the plurality of vehicles 102 may be communicatively coupled to the wireless communication network 106. In accordance with an embodiment, the wireless communication network 106 may be used for a vehicle to vehicle (V2V) communication among the plurality of vehicles 102. The wireless communication network 106 may also be used for a vehicle to infrastructure (V2I) communication between one of the plurality of vehicles 102 and the RSU 120.

The first vehicle 102a may be an autonomous vehicle that may operate in an autonomous mode, a semi-autonomous mode, or a manual mode. Alternatively, the first vehicle 102a may be a non-autonomous vehicle. The first vehicle 102a may comprise the ECU 108, which may be configured to communicate with the cloud server 104, and/or one or more other vehicles of the plurality of vehicles 102, via the wireless communication network 106. Examples of the plurality of vehicles 102 (which include the first vehicle 102a and the second vehicle 102b) may include, but are not limited to, a motor vehicle, a hybrid vehicle, and/or a vehicle that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources.

The cloud server 104 may comprise suitable logic, circuitry, interfaces, and/or code that may be configured to establish a communication channel with one or more vehicles, such as the first vehicle 102a. The cloud server 104 may be configured to store information received from the one or more vehicles, such as the first vehicle 102a. The cloud server 104 may be a web server, a database server, a file server, an application server, a cloud-based server, or a combination thereof. The cloud server 104 may be implemented by use of several technologies that are well known to those skilled in the art.

The wireless communication network 106 may include a medium through which the first vehicle 102a may communicate with the RSU 120, the cloud server 104, and/or one or more other vehicles, such as the second vehicle 102b. Examples of the wireless communication network 106 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be operable to connect to the wireless communication network 106, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), Near-Field Communication (NFC), and/or Bluetooth (BT) communication protocols.

The ECU 108 may comprise suitable logic, circuitry, interfaces, and/or code that may be configured to process sound data for driver assistance. The ECU 108 may receive sound data captured by the two or more audio-input devices 110a to 110h. The sound data may be the sound emanated by one or more other vehicles, such as the second vehicle 102b, in the road portion 118. Based on the received sound data, the ECU 108 may determine a distance of the first vehicle 102a and the one or more other vehicles in a vicinity of the first vehicle 102a. Further, the ECU 108 may generate an in-vehicle alert for the first vehicle 102a based on the determined distance. The in-vehicle alert may comprise a virtual sound representative of sound emanated from at least one of the one or more other nearby vehicles, such as the second vehicle 102b.

The ECU 108 may be further configured to access sensor data of the first vehicle 102a, or to communicate one or more control commands to other ECUs, components, or systems of the first vehicle 102a. The sensor data may be accessed by the ECU 108, via an in-vehicle network, such as a controller area network (CAN) bus. In accordance with an embodiment, the ECU 108 may be configured to receive vehicle data from one or more connected vehicles from the plurality of vehicles 102 in a vehicle-to-vehicle (V2V) communication, via a wireless communication system. In accordance with an embodiment, the ECU 108 may be configured to receive vehicle data of one or more connected vehicles from the cloud server 104 in an infrastructure-to-vehicle (I2V) communication. In such a case, the one or more connected vehicles from the plurality of vehicles 102 may communicate corresponding vehicle data to the cloud server 104 beforehand, in a vehicle-to-infrastructure (V2I) communication.

The two or more audio-input devices 110a to 110h may refer to sensors, microphones, or transducers that convert sound energy into electrical signals. The two or more audio-input devices 110a to 110h may be configured to capture sound emanated from the one or more automobiles, such as, but not limited to, a two wheeler, a three wheeler, a four wheeler, a truck, and/or a trailer. The one or more automobiles may include other vehicles in the plurality of vehicles 102. The two or more audio-input devices 110a to 110h may capture the sound based on measurement of sound pressure and/or acoustic particle velocity of a sound field, such as a sound wave of the emanated sound. Sound emanated from automobiles, such as a four wheeler, a three wheeler, or a two wheeler, may comprise a certain distinct pitch and loudness values generated by engine, tires, horn, or other components of the automobile. The two or more audio-input devices 110a to 110h may comprise audio filters that may be configured to capture sounds (such as engine or tire sounds) in pre-defined range of pitch, loudness, and sound duration such as to filter out other noise on the road portion 118. In accordance with an embodiment, the two or more audio-input devices 110a to 110h may be positioned in the first vehicle 102a to capture sound from various directions around the first vehicle 102a, as shown in FIG. 1. The two or more audio-input devices 110a to 110h may be communicatively coupled to the ECU 108. The two or more audio-input devices 110a to 110h may send sound data associated with the captured sound to the ECU 108 for further processing. Hereinafter, the two or more image-capturing devices 110a to 110h may be collectively referred to as audio-input devices 110.

The one or more image-capturing devices 112a to 112b may comprise suitable logic, circuitry, interfaces, and/or code that may be configured to capture one or more video streams of a road portion, such as the road portion 118. The video streams may include a plurality of image frames of one or more fields-of-view (FOVs) of the one or more image-capturing devices 112a to 112b. The one or more image-capturing devices 112a to 112b may be configured to record time of capture of each frame of the plurality of image frames in the captured one or more video streams. Examples of the one or more image-capturing devices 112a to 112b may include, but are not limited to, an image sensor, a wide-angle camera, a closed-circuit television (CCTV) camera, a camcorder, an in-built camera of a smart-glass, and/or other such vehicle cameras. The image-capturing devices 112a and 112b may be installed at outside rear view mirrors (ORVM) of the first vehicle 102a (as shown). Though not shown in FIG. 1, the image-capturing devices may also include one or more other cameras installed at the front, the rear, and the sides of the vehicle body of the first vehicle 102a. For instance, the one or more other cameras may be installed at locations adjacent to that of the two or more audio-input devices 110a to 110h. In accordance with an embodiment, instead of multiple image-capturing devices, one rotatable image-capturing device may be provided that may be configured to capture a 360 degree view of the road portion 118 in the vicinity of the first vehicle 102a. Hereinafter, the one or more image-capturing devices 112a to 112b may be collectively referred to as image-capturing devices 112.

The RSU 120 may be configured to wirelessly communicate to the plurality of vehicles 102 on the road portion 118. The RSU 120 may be further configured to communicate with the cloud server 104 via the Internet, or a suitable communication protocol known in the art. The RSU 120 may correspond to an infrastructure unit or a communication device installed at the road portion 118. In accordance with an embodiment, multiple RSUs similar to the RSU 120 may be installed along the road portion 118 or other road portions.

In operation, the two or more audio-input devices 110a to 110h may be configured to capture sound emanated from one or more other vehicles of the plurality of vehicles 102. The two or more audio-input devices 110a to 110h may apply one or more audio filters to remove noise from the captured sound and generate sound data associated with the captured sound. The two or more audio-input devices 110a to 110h may then send the sound data to the ECU 108 of the first vehicle 102a for further processing.

In accordance with an embodiment, the ECU 108 may determine a distance of the first vehicle 102a from at least the second vehicle 102b from the one or more other vehicles in the plurality of vehicles 102. The distance may be determined based on the sound data received from the two or more audio-input devices 110a to 110h. The ECU 108 may be further configured to generate an in-vehicle alert for the first vehicle 102a based on the determined distance. In accordance with an embodiment, the generation of the in-vehicle alert by the ECU 108 may also be based on the determined relative position and/or the angle of the first vehicle 102a with respect to the second vehicle 102b. The in-vehicle alert may comprise a virtual sound representative of sound emanated from the second vehicle 102b.

In accordance with an embodiment, the in-vehicle alert may be provided to the driver 114 associated with the first vehicle 102a, via a first set of audio-output devices (not shown) in the first vehicle 102a. The first set of audio-output devices may direct a sound field associated with the in-vehicle alert, via a sound beam targeted towards the driver 114. Alternatively, the in-vehicle alert may be provided to all passengers of the first vehicle 102a including the driver 114 and one or more co-passengers, via a second set of audio-output devices (not shown) in the first vehicle 102a. The in-vehicle alert may be provided to all passengers based on a traffic condition associated with a travel path, such as the road portion 118, of the first vehicle 102a. The In addition to the virtual sound, the in-vehicle alert may further include an accident warning, a driving-maneuver instruction, a speed-change recommendation, a vehicle-overtake recommendation, a lane-change recommendation, driving-condition information, an obstacle warning, and/or a selected vehicle tracking.

In accordance with an embodiment, the ECU 108 may be further configured to determine a position and/or an angle of the second vehicle 102b with respect to the first vehicle 102a based on the received sound data. Further, the ECU 108 may apply a Head-Related Transfer Function (HRTF) based on the determined distance and/or the angle for the reproduction of the virtual sound representative of the sound emanated from the second vehicle. In addition, the ECU 108 may determine a type of the second vehicle 102b based on a comparison of a pre-stored audio signature associated with the second vehicle 102b and the sound emanated from the second vehicle 102b. In accordance with an embodiment, the virtual sound of the in-vehicle alert may be reproduced in accordance with the determined type of the second vehicle 102b. Further, the virtual sound may be reproduced when the determined distance between the first vehicle 102a and the second vehicle 102b is less than a pre-specified threshold distance.

In accordance with an embodiment, the ECU 108 may be further configured to determine speed of the one or more other vehicles from the plurality of vehicles 102 based on the captured sound emanated from the one or more other vehicles. In addition, the ECU 108 may determine a relative velocity of the second vehicle 102b with respect to the first vehicle 102a based on the sound emanated from the second vehicle 102b. In accordance with an embodiment, an audio warning may be generated for the driver 114 of the first vehicle 102a, along with the virtual sound, based on the determined distance and/or the relative velocity.

In accordance with an embodiment, one or more objects may be present in a travel path, such as the road portion 118, of the first vehicle 102a. In accordance with an embodiment, image-capturing devices 112a to 112g (when present) may capture one or more images of one or more objects in the travel path of the first vehicle 102a. The one or more objects may be recognized based on the one or more images captured by the one or more image-capturing devices 112a to 112b. The ECU 108 may be configured to determine a distance of the one or more objects from the first vehicle 102a based on the one or more images received from the one or more image-capturing devices 112a to 112b. In accordance with an embodiment, the in-vehicle alert may further include a second audio-output including another virtual sound associated with the one or more objects. The ECU 108 may generate the other virtual sound based on one or more pre-recorded audio tracks associated with each type of the one or more objects. The inclusion of the other virtual sound in the in-vehicle alert may be indicative of a presence and type of the one or more objects in the travel path of the first vehicle 102a within a pre-specified distance from the first vehicle 102a.

In accordance with an embodiment, the ECU 108 may control display of a virtual object via an infotainment system of the first vehicle 102a based on the captured one or more images. The virtual object may be representative of the recognized one or more objects present in the travel path of the first vehicle 102a. In accordance with an embodiment, the in-vehicle alert may include an indication of such recognized one or more objects present in the travel path of the first vehicle 102a. In accordance with an embodiment, the second vehicle 102b may be displayed on a map via the infotainment system of the first vehicle 102a. The display of the second vehicle 102b on the map may be controlled by the ECU 108 based on the captured one or more images and the determined distance between the first vehicle 102a and the second vehicle 102b. In accordance with an embodiment, similar to the display of the second vehicle 102b on a map, other nearby or fast-moving vehicles of the plurality of vehicles 102 may be displayed on the map to make the driver 114 aware of the traffic scenario around the first vehicle 102a.

In accordance with an embodiment, a user of the infotainment system of the first vehicle 102a may select a specific vehicle that is to be tracked by one or more sensors of the first vehicle, such as two or more audio capture devices 110a to 110h and image capture devices (not shown in FIG. 1). The user of the infotainment system may either be the driver of the first vehicle 102a or one of the one or more co-passengers of the first vehicle 102a. For instance, the driver 114 of the first vehicle 102a may select the second vehicle 102b for tracking via a user interface of the infotainment system, such as via a touch-based user interface provided on a display screen of the infotainment system. The relative position of the second vehicle 102b may be tracked with respect to the first vehicle 102a based on an audio and/or one or more images captured from the second vehicle 102b by the one or more sensors of the first vehicle 102a. Thereafter, the tracked relative position of the second vehicle 102b may be provided to through the in-vehicle alert and/or displayed on the map via the infotainment system of the first vehicle 102a.

In accordance with an embodiment, information that corresponds to a traffic condition associated with the travel path of the first vehicle 102a may be transmitted to a traffic management server, such as the cloud server 104, and/or an electronic device, such as a personal device, of a user via the wireless communication network 106. The transmission of the traffic condition information may be based on the determined distance, the relative velocity, and/or the type of the one or more other vehicles, such as the second vehicle 102b. The transmission of the traffic condition information may be further based on a count of the one or more other vehicles in the plurality of vehicles 102 within a pre-determined distance from the first vehicle 102a.

In accordance with another aspect of the disclosure, the first vehicle 102a may correspond to a vehicle that may be operable in an autonomous mode and/or a semi-autonomous mode. The ECU 108 may determine the distance between the first vehicle 102a and the second vehicle 102b based on the received sound data. As discussed, the sound data may correspond to the sound emanated by the one or more other vehicles in the plurality of vehicles 102 captured by the two or more audio-input devices 110a to 110h. Based on the determined distance, the ECU 108 may control an automatic-drive of the first vehicle 102a on a travel path of the first vehicle 102a along the road portion 118. Further, the ECU 108 may be configured to transmit a message indicative of the control of the automatic-drive to an electronic device, such as a smartphone, of a human-navigator or driver (such as the driver 114) of the first vehicle 102a, via the wireless communication network 106. The first vehicle 102a may correspond to one of an autonomous vehicle, a semi-autonomous vehicle, and/or a non-autonomous vehicle.

Figure 2:
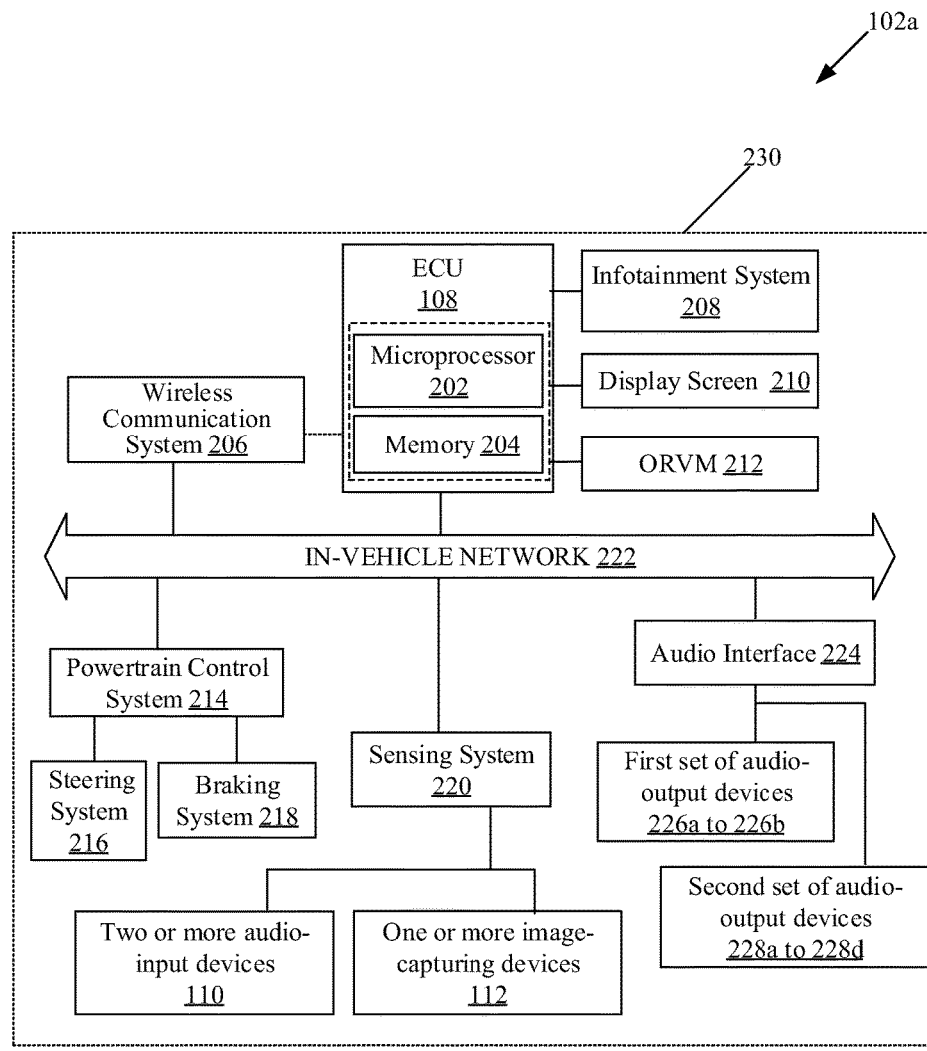
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the first vehicle 102a. The first vehicle 102a may comprise the ECU 108 that may include a microprocessor 202 and a memory 204. The first vehicle 102a may further comprise a wireless communication system 206, an infotainment system 208, a display screen 210, an outside rear view mirror (ORVM) 212, a powertrain control system 214, a steering system 216, a braking system 218, a sensing system 220, an in-vehicle network 222, and an audio interface 224. The sensing system 220 may include two or more audio-input devices 110 (such as the audio-input devices 110a to 110h) and one or more image-capturing devices 112 (such as the image-capturing devices 112a to 112b). The audio interface 224 may include a first set of audio-output devices 226a and 226b for the driver 114 of the first vehicle 102a and a second set of audio-output devices 228a to 228d that may be common for the driver 114 and all co-passengers of the first vehicle 102a. There is further shown a vehicle body 230.

The various components or systems may be communicatively coupled to each other, via the in-vehicle network 222, such as a vehicle area network (VAN), and/or an in-vehicle data bus. The microprocessor 202 may be communicatively coupled to the memory 204, the wireless communication system 206, the infotainment system 208, the display screen 210, the ORVM 212, the powertrain control system 214, the sensing system 220, and the audio interface 224, via the in-vehicle network 222. It should be understood that the first vehicle 102a may also include other suitable components or systems, but for brevity, those components or systems which are used to describe and explain the function and operation of the present disclosure are illustrated herein.

The microprocessor 202 may comprise suitable logic, circuitry, interfaces, and/or code that may be configured to execute a set of instructions stored in the memory 204. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may be further configured to store sound signatures related to vehicles for recognition of vehicle type of the plurality of vehicles 102. The memory 204 may be further configured to store template images of various types of objects for recognition of the one or more objects from the captured one or more images. The memory 204 may further store pitch and frequency values associated with vehicles and objects of various types. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The wireless communication system 206 may comprise suitable logic, circuitry, interfaces, and/or code that may be configured to communicate with one or more external devices, such as the cloud server 104, under the control of the microprocessor 202. Such communication with the one or more external devices may occur by use of the wireless communication network 106. The wireless communication system 206 may include various components, which are not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card.

The wireless communication system 206 may communicate with networks, such as the wireless communication network 106 under the control of the microprocessor 202, via a wireless communication protocol, such as a dedicated short-range communication (DSRC) protocol. The wireless communication system 206 may use various communication standards, protocols and technologies, such as the global system for mobile communications (GSM), enhanced data GSM environment (EDGE), wideband code division multiple access (W-CDMA), code division multiple access (CDMA), long term evolution (LTE), time division multiple access (TDMA), Bluetooth (BT), Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The infotainment system 208 may provide entertainment and informational media as output to a user of the first vehicle 102a. The infotainment system 208 may be connected to one or more servers (including the cloud server 104, and/or one or more other servers, such as media or file servers) to receive media to be played back to the user of the first vehicle 102a. The infotainment system 208 may be communicatively coupled to an electronic device, such as a personal device, of the user to receive and wirelessly play media from the coupled electronic device. The media may include audio, video, textual information and metadata, and/or information provisioned as value-added service to the user from a service operator.

In accordance with an embodiment, the infotainment system 208 may be connected to the one or more servers and/or the electronic device via the wireless communication network 106 or a vehicular network. In accordance with an embodiment, the infotainment system 208 may include a built-in GPS system that may detect GPS co-ordinates of a current location of the first vehicle 102a. Alternatively, the infotainment system 208 may be communicatively coupled to a GPS system that may be installed as a separate component in the first vehicle 102a. Based on inputs from the GPS system, the first vehicle 102a and one or more other vehicles or objects recognized by the ECU 108 may be displayed on a map with reference to the first vehicle 102a, via the display screen 210.

The display screen 210 may refer to a touch screen to receive an input from the driver 114 and to display various types of information to occupants, such as the driver 114, of the first vehicle 102a. The first vehicle 102a may include other input/output (I/O) devices that may be configured to communicate with the microprocessor 202. Examples of the display screen 210 may include, but not limited to, a display of the head unit, a tablet computer, a computing device with an electronic display, a heads-up display (HUD), a heads-up display with an augmented reality system (AR-HUD), a driver information console (DIC), a projection-based display, a see-through display, a smart-glass display, and/or an electro-chromic display. In accordance with an embodiment, the image-capturing devices 112d and 112e may be installed at the ORVM 212 of the first vehicle 102a (as shown in FIG. 1).

The powertrain control system 214 may refer to an onboard computer of the first vehicle 102a that controls operations of an engine and a transmission system of the first vehicle 102a. The powertrain control system 214 may control the engine's ignition, fuel injection, emission systems, and/or operations of the transmission system (such as automatic transmission system) and the braking system 218. The transmission system may refer to a manual transmission, a synchronized transmission, a fully automatic transmission, a semi-automatic transmission, a Continuously Variable Transmission (CVT), a sequential transmission, dual-clutch transmission (DCT), or other transmission known in the art.

The steering system 216 may be associated with the powertrain control system 214. The steering system 216 may include a steering wheel and/or an electric motor (provided for a power-assisted steering) that may be used by the driver 114 to control movement of the first vehicle 102a in manual mode or a semi-autonomous mode. In accordance with an embodiment, the movement or steering of the first vehicle 102a may be automatically controlled when the first vehicle 102a is in autonomous mode. Examples of the steering system 216 may include, but are not limited to, an autonomous steering control, a power-assisted steering system, a vacuum/hydraulic-based steering system, an electro-hydraulic power-assisted system (EHPAS), or a "steer-by-wire" system, known in the art.

The braking system 218 may be used to stop or slow down the first vehicle 102a by application of frictional forces. The braking system 218 may be configured to receive a command from the powertrain control system 214 under the control of the microprocessor 202, when the first vehicle 102a is in an autonomous mode or a semi-autonomous mode.

The sensing system 220 may comprise the two or more audio-input devices 110 and the image-capturing devices 112 provided in the first vehicle 102a. The sensing system 220 may be operatively connected to the ECU 108, via the in-vehicle network 222, to provide input signals to the microprocessor 202. One or more communication interfaces, such as a CAN interface, may be provided in the sensing system 220 to connect to the in-vehicle network 222. The sensing system 220 may also include an object detection device (not shown in FIG. 2) that may correspond to a RADAR device and/or a laser-based object detection sensor, such as a light detection and ranging (LIDAR) device. Further, the sensing system 220 may include one or more ultrasonic sensors (not shown in FIG. 2), which may be used to improve accuracy of the distance detected between the first vehicle 102a and the other vehicles, such as the second vehicle 102b once the captured traffic sound data is processed. Further, the one or more ultrasonic sensors may also be used to determine speed or relative velocity of the other vehicles with respect to the first vehicle 102a. Examples of the one or more vehicle sensors of the sensing system 220 may further include, but are not limited to, a vehicle speed sensor, the odometric sensors, a yaw rate sensor, a speedometer, a global positioning system (GPS), a steering angle detection sensor, a vehicle travel direction detection sensor, a magnometer, an image sensor, a touch sensor, and/or an infrared sensor. The one or more vehicle sensors of the sensing system 220 may be configured to detect a direction of travel, geospatial position, steering angle, yaw rate, speed, and/or rate-of-change of speed of the first vehicle 102a.

The in-vehicle network 222 may include a medium through which the various components or systems of the first vehicle 102a, such as the ECU 108, the audio interface 224, the powertrain control system 214, the sensing system 220, and/or the wireless communication system 206, may communicate with each other. The in-vehicle network 222 may facilitate access control and/or communication between the microprocessor 202 and other ECUs, such as the audio interface 224 or a body control module, of the first vehicle 102a. Various devices in the first vehicle 102a may be configured to connect to the in-vehicle network 222, in accordance with various wired and wireless communication protocols. One or more communication interfaces, such as the CAN interface, a Local Interconnect Network (LIN) interface, a Media Oriented Systems Transport (MOST) interface, may be used by the various components or systems of the first vehicle 102a to connect to the in-vehicle network 222. Examples of the wired and wireless communication protocols for the in-vehicle network 222 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The audio interface 224 may be connected to the first set of audio-output devices 226a and 226b, the second set of audio-output devices 228a to 228d, a chime, a buzzer, or other device that may be operable to generate a sound. The audio interface 224 may also be connected to a microphone or other device to receive a voice input from an occupant of the first vehicle 102a, such as the driver 114. The audio interface 224 may be a part of an infotainment unit (such as the infotainment system 208) or a head unit of the first vehicle 102a. In accordance with an embodiment, in-vehicle communication of audio/video data for multimedia components may occur by use of Media Oriented Systems Transport (MOST) multimedia network protocol of the in-vehicle network 222. The first set of audio-output devices 226a and 226b may be installed near or on the driver's seat to provide an audio output directed towards the driver 114 of the first vehicle 102a. The second set of audio-output devices 228a to 228d may be installed on corners in an interior of the first vehicle 102a to provide audio output to all passengers of the first vehicle 102a. In case the first vehicle 102a is a two wheeler such as a bike, one or more audio output devices associated with the audio interface 224 may be provided within a helmet of the bike rider. In such a scenario, the in-vehicle alert may be provided to the bike rider through the one or more audio output devices within the bike rider's helmet, while the pillion rider may not hear such in-vehicle alerts. The pillion rider's helmet may include another audio output device that may play music or other audio content. In another scenario, the pillion rider's helmet may not include an audio output device.

The vehicle body 230 may refer to an outer shell (such as outer panels and/or a frame assembly other than chassis) of the first vehicle 102a, which cover the various components and systems as described above, and other mechanical and electrical workings or components of a vehicle, such as the first vehicle 102a. A body type of the vehicle body 230 may be a unitized body (or a uni-body), a body-on-frame, a body with ancillary sub-frames, a dual frame body, and/or other body structures known in the art. A body style of the vehicle body 230 may be a sports utility vehicle (SUV), a van, a truck, a sedan, a coupe, a convertible, a hatchback, a sports car, and/or other body styles known in the art.

In operation, the two or more audio-input devices 110a to 110d may be configured to capture sound emanated from the one or more other vehicles of the plurality of vehicles 102. The one or more other vehicles that may include the second vehicle 102b may be in a vicinity to the first vehicle 102a on the road portion 118. The two or more audio-input devices 110a to 110d may apply one or more audio filters to remove noise from the captured sound and generate sound data associated with the captured sound. The two or more audio-input devices 110a to 110d may then send the sound data to the ECU 108 of the first vehicle 102a for further processing, via the in-vehicle network 222.

In accordance with an embodiment, the ECU 108 may determine a relative position (distance and/or angle) of the first vehicle 102a from the one or more other vehicles, such as the second vehicle 102b. The relative position may be determined based on the sound data received from the two or more audio-input devices 110a to 110d. The determination of the relative position is explained in further details in FIGS. 3, 4, 5, 6, 7, and 8. The ECU 108 may be further configured to generate an in-vehicle alert for the first vehicle 102a based on the determined relative position. The in-vehicle alert may comprise a virtual sound representative of sound emanated from the one or more other vehicles, such as the second vehicle 102b. The virtual sound may be reproduced by the first set of audio-output devices 226a and 226b in the first vehicle 102a. The first set of audio-output devices 226a and 226b may direct a sound field associated with the in-vehicle alert, via a sound beam targeted towards the driver 114. Alternatively, the in-vehicle alert may be provided to all passengers of the first vehicle 102a including the driver 114 and one or more co-passengers, via the second set of audio-output devices 228a to 228d in the first vehicle 102a. The in-vehicle alert may be provided to all passengers based on a traffic condition associated with a travel path of the first vehicle 102a along the road portion 118. The generation and reproduction of the in-vehicle alert including the virtual sound is explained in further detail in FIGS. 5, 9A, and 9B. Further, details related to implementation of the in-vehicle driver assistance system in various exemplary traffic scenarios are explained in FIGS. 10 to 13. Examples of the in-vehicle alert may include, but not limited to, an accident warning, a driving-maneuver instruction, a speed-change recommendation, a vehicle-overtake recommendation, a lane-change recommendation, driving-condition information, an obstacle warning, and/or a selected vehicle tracking.

Figure 3:
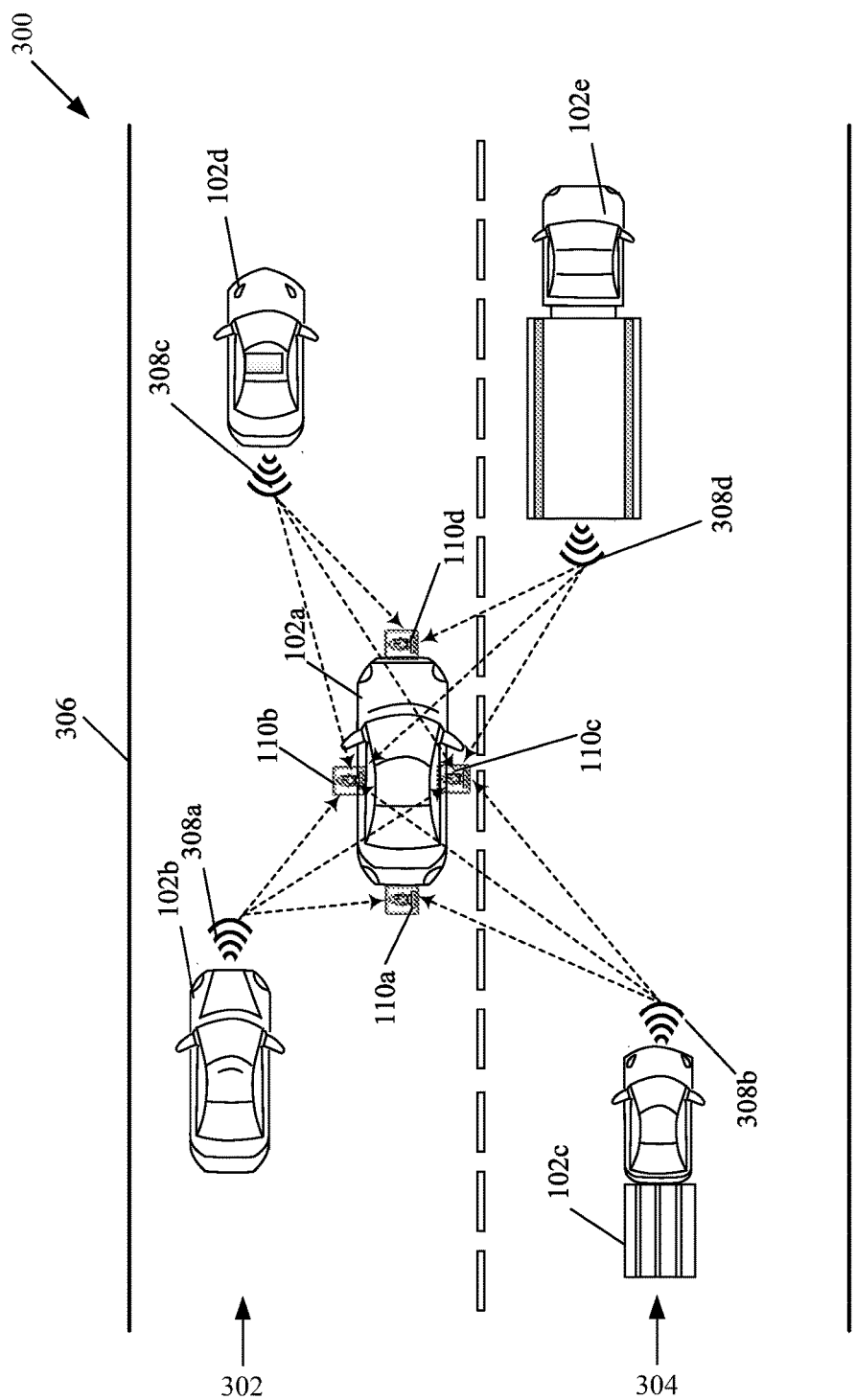
FIG. 3 illustrates a first exemplary top view of a road portion that depicts capture of traffic sound emanated from vehicles in vicinity of a first vehicle, in accordance with an embodiment of the disclosure.

FIG. 3 illustrates a first exemplary top view of a road portion that depicts capture of traffic sound emanated from one or more other vehicles in vicinity of the first vehicle 102a, in accordance with an embodiment of the disclosure. FIG. 3 is explained in conjunction with elements from FIG. 1 and FIG. 2. With reference to FIG. 3, there is shown a top view 300 of a road portion 306 that may include a first lane 302 and a second lane 304. The plurality of vehicles 102 are shown to traverse along the road portion 306. The plurality of vehicles 102 may include the first vehicle 102a and one or more other vehicles, such as the second vehicle 102b, a third vehicle 102c, a fourth vehicle 102d, and a fifth vehicle 102e. The third vehicle 102c, the fourth vehicle 102d, and the fifth vehicle 102e are newly shown one or more other vehicles in the plurality of vehicles 102.

Sound emanated from the second vehicle 102b, the third vehicle 102c, the fourth vehicle 102d, and the fifth vehicle 102e may be represented as a first sound beam 308a, a second sound beam 308b, a third sound beam 308c, and a fourth sound beam 308d, respectively. The first vehicle 102a is shown to include the two or more audio-input devices 110a to 110d. The first vehicle 102a, the second vehicle 102b, and the fourth vehicle 102d are shown to traverse along the first lane 302, while the third vehicle 102c and the fifth vehicle 102e are shown to traverse along the second lane 304.

In accordance with an embodiment, the audio-input devices 110a, 110b, and 110c (positioned at the rear end, left side, and right side of the first vehicle 102a respectively, as shown) may capture sound emanated from other vehicles that may lie behind the first vehicle 102a more prominently than the audio-input device 110d along the road portion 306. For instance, as shown in FIG. 3, the second vehicle 102b and the third vehicle 102c lie behind the first vehicle 102a on the road portion 306, on the left side and the right side of first vehicle 102a, respectively. The first sound beam 308a emanated from the second vehicle 102b and the second sound beam 308b emanated from the third vehicle 102c may be captured at least by the audio-input devices 110a, 110b, and 110c.

Figure 6:
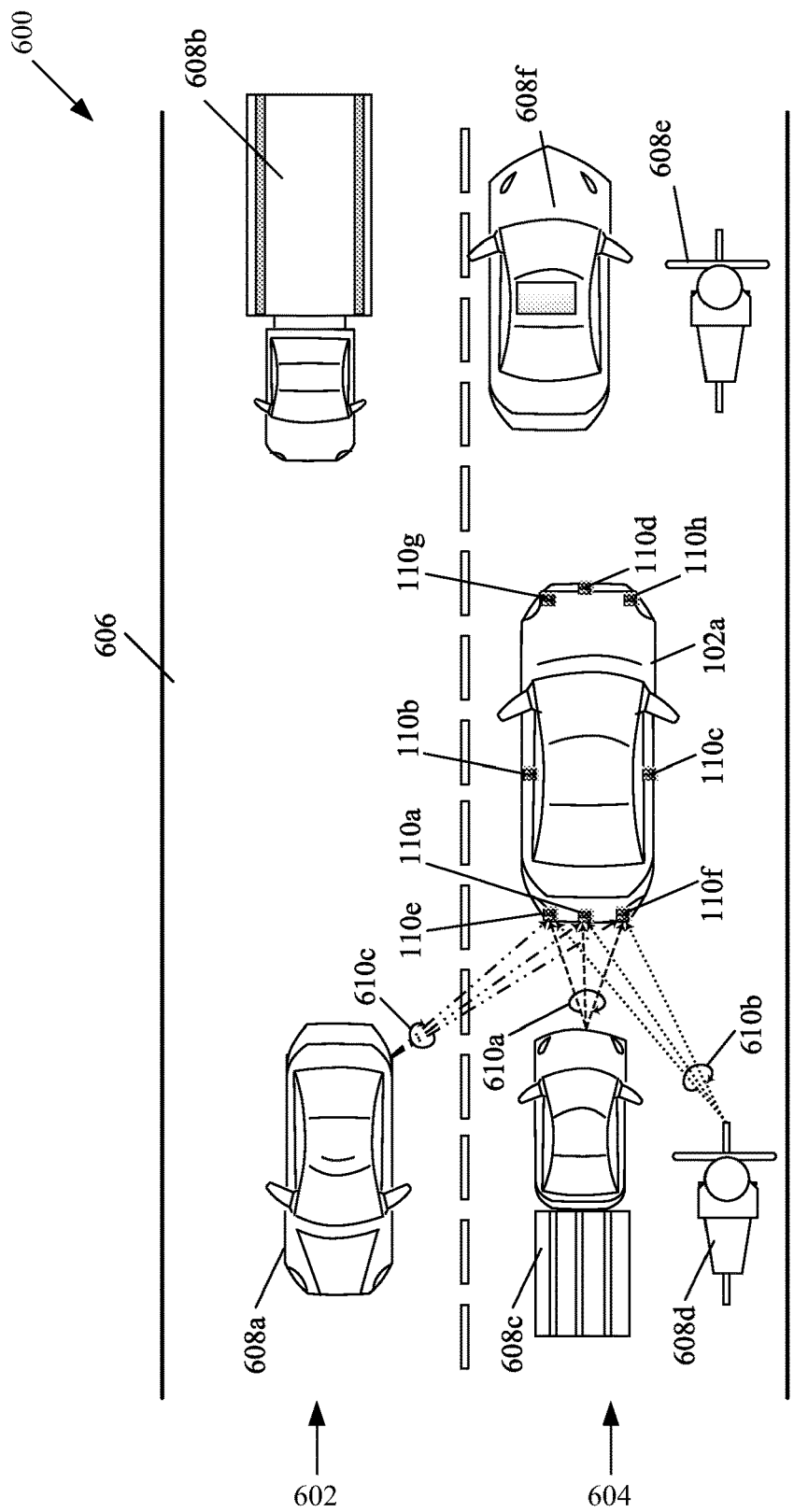
FIG. 6 illustrates a second exemplary top view of a road portion that depicts capture of traffic sound emanated from vehicles in vicinity of a first vehicle, in accordance with an embodiment of the disclosure.

Similarly, the audio-input devices 110b, 110c, and 110d (positioned at the left side, right side, and front end of the first vehicle 102a respectively, as shown) may capture sound emanated from other vehicles that may lie in front of (or side-by-side with) the first vehicle 102a more prominently than the audio-input device 110a along the road portion 306. For instance, as shown in FIG. 3, the fourth vehicle 102d and the fifth vehicle 102e lie in front of the first vehicle 102a on the road portion 306, on the left side and the right side of first vehicle 102a, respectively. The third sound beam 308c emanated from the fourth vehicle 102d and the fourth sound beam 308d emanated from the fifth vehicle 102e may be captured at least by the audio-input devices 110b, 110c, and 110d. FIG. 3 represents an embodiment where only four audio-input devices 110a to 110d of the first vehicle 102a may be used to capture the sound emanated from the nearby vehicles. It may be understood by a person skilled in the art that sound emanated from the other vehicles may be captured by use of additional audio-input devices, if provided in the first vehicle 102a. Thus, other scenarios in which more than four audio-input devices are used may also be possible. For instance, a scenario where all the eight audio-input devices 110a to 110h of the first vehicle 102a may be used to capture the sound emanated from the nearby vehicles, is illustrated in FIG. 6.

Figure 4:
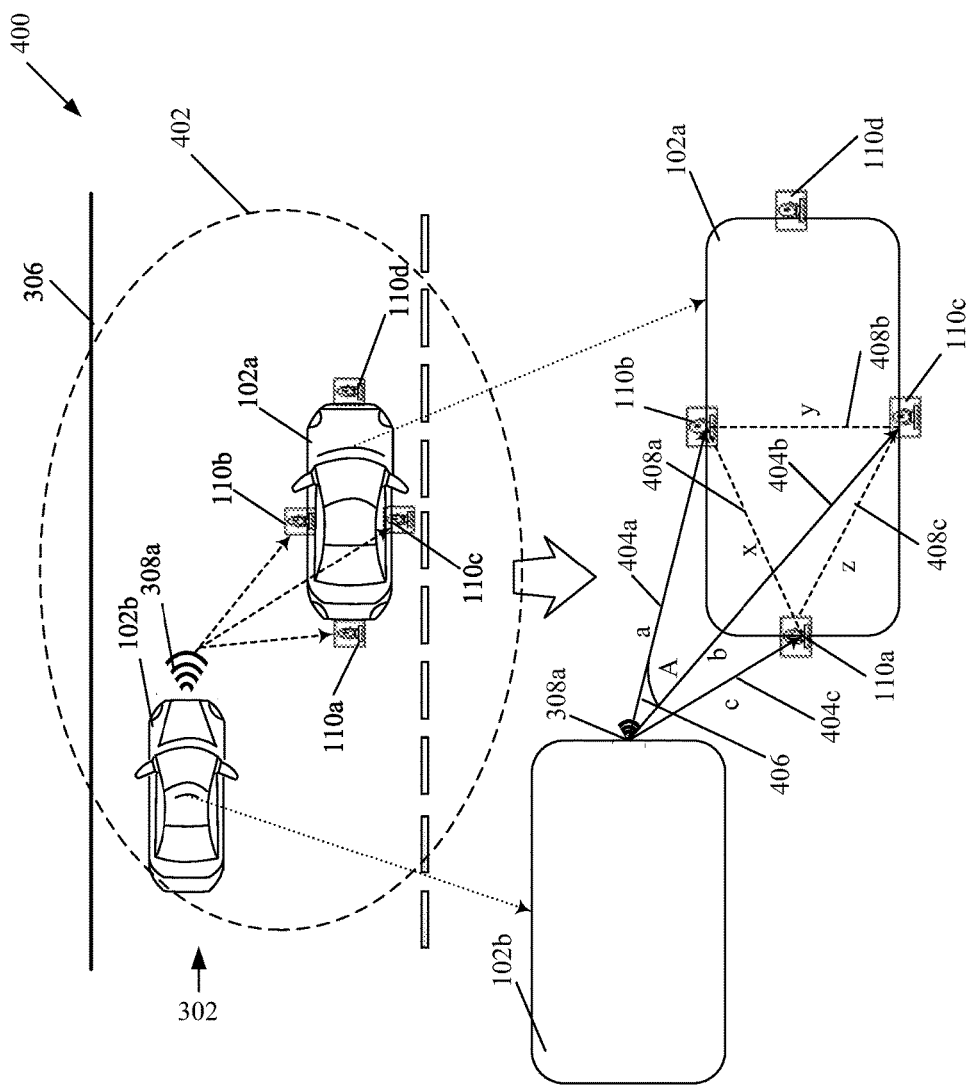
FIG. 4 illustrates an exemplary computation of a position of a nearby vehicle with respect to a first vehicle based on processing of traffic sound data, in accordance with an embodiment of the disclosure.

FIG. 4 illustrates an exemplary computation of a position of a nearby vehicle with respect to the first vehicle 102a, in accordance with an embodiment of the disclosure. FIG. 4 is explained in conjunction with elements from FIGS. 1, 2, and 3. With reference to FIG. 4, there is shown an exemplary top view 400 that depicts an area 402 of the road portion 306. The area 402 of the road portion 306 may include a certain portion of the first lane 302 of FIG. 3 including the first vehicle 102a and the second vehicle 102b. Also shown in FIG. 4 are the audio-input devices 110a to 110d of the first vehicle 102a and the first sound beam 308a, which corresponds to sound emanated from the second vehicle 102b.

Further, a block diagram of the first vehicle 102a and the second vehicle 102b is shown side-by-side to illustrate computation of position of the second vehicle 102b with respect to the first vehicle 102a in the area 402 of the road portion 306. The position of the second vehicle 102b with respect to the first vehicle 102a may be ascertained based on the first sound beam 308a emanated from the second vehicle 102b, and captured at the first vehicle 102a. There is further shown various distances, such as a first distance 404a, a second distance 404b and a third distance 404c (also represented as distances or sides "a", "b", and "c"), from the center of the front end of the second vehicle 102b and the audio-input devices 110a, 110b, and 110c.

Further, the block diagrams of FIG. 4 illustrate pre-determined distances 408a, 408b, and 408c (also represented as "x", "y" and "z") among the audio-input devices 110a, 110b, and 110c, The pre-determined distances 408a, 408b, and 408c may be pair-wise distances between a pair of the audio-input devices 110a, 110b, and 110c, as shown. The pre-determined distances 408a, 408b, and 408c may be determined based on installation positions of the audio-input devices 110a to 110d in the first vehicle 102a. There is further shown an angle 406 (also represented as angle "A") formed between the sides "a" (the first distance 404a) and "b" (the second distance 404b) of the triangle "bay". The computation of the position of the second vehicle 102b with respect to the first vehicle 102a is further explained in FIG. 5 below.

Figure 5:
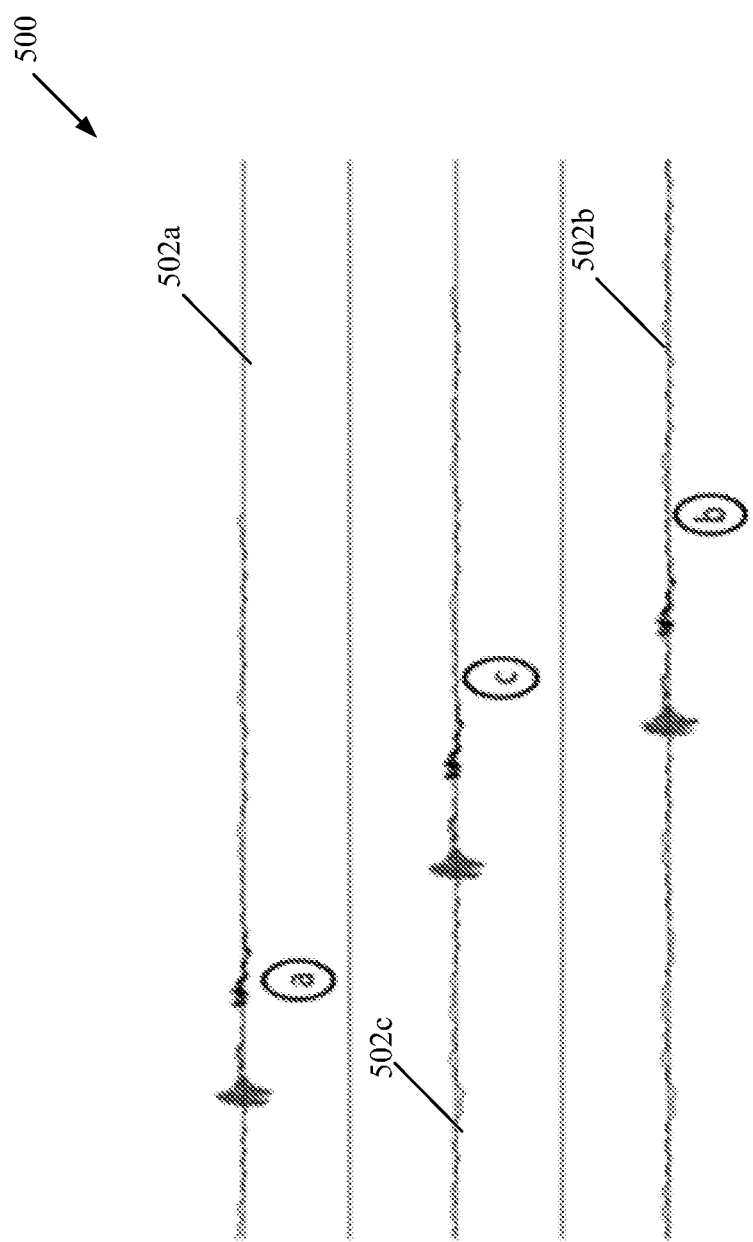
FIG. 5 illustrates a first exemplary pattern of traffic sound data captured from a nearby vehicle by the first vehicle for determination of relative position of the nearby vehicle with respect to the first vehicle, in accordance with an embodiment of the disclosure.

FIG. 5 illustrates a first exemplary pattern of traffic sound data captured from a nearby vehicle by the first vehicle 102a for determination of a relative position of the nearby vehicle with respect to the first vehicle 102a, in accordance with an embodiment of the disclosure. FIG. 5 is explained in conjunction with elements from FIGS. 1, 2, 3, and 4. With reference to FIG. 5, there is shown a sound signal pattern 500 associated with sound signals captured by the audio-input devices 110a to 110c from the second vehicle 102b (of FIG. 4). For the sake of brevity, the sound signal pattern 500 shows capture of sound emanated from the second vehicle 102b of the one or more other vehicles.

In accordance with an embodiment, the sound signal pattern 500 may include sound signals associated with the first sound beam 308a that corresponds to the sound emanated from the second vehicle 102b (FIG. 4). The sound signal pattern 500 is shown to include a first sound signal 502a, a second sound signal 502b, and a third sound signal 502c. Each of the three sound signals 502a to 502c may correspond to a sound channel that may be captured by an audio-input device from the audio-input devices 110a to 110c. In accordance with an embodiment, each of the three sound signals 502a to 502c may correspond to the first sound beam 308a emanated from the second vehicle 102b. Thus, each of the three sound signals 502a to 502c may be emanated at the same time from the same sound source, that is, the second vehicle 102b.

In operation, the audio-input devices 110a to 110d may receive sound emanated from the one or more other vehicles, such as the second vehicle 102b, that travel on the road portion 306. As shown in FIG. 4, the second vehicle 102b may lie behind the first vehicle 102a in the first lane 302 of the road portion 306. The audio-input devices 110a, 110b, and 110c may capture the sound emanated from the second vehicle 102b, such as the first sound beam 308a. Now referring back to FIG. 5, the first sound signal 502a may correspond to the first distance 404a (also represented as "a") between the second vehicle 102b and the audio-input device 110b (at the left side of the first vehicle 102a). The second sound signal 502*b* may correspond to the second distance 404*b* (also represented as "b") between the second vehicle 102*b* and the audio-input device 110*c* (at the right side of the first vehicle 102*a*). Further, the third sound signal 502*c* may correspond to the third distance 404*c* (also represented as "c") between the second vehicle 102*b* and the audio-input device 110*a* (at the rear end of the first vehicle 102*a*).

As shown in FIG. 5, the first sound signal 502*a* may arrive ahead of the other sound signals at the first vehicle 102*a* captured by the audio-input device 110*a*, due to the positioning of the audio-input devices 110*a* around the first vehicle 102*a*. The first sound signal 502*a* may be followed by the third sound signal 502*c* and then the second sound signal 502*b*, as shown. In accordance with an embodiment, a time of arrival of a sound signal at the first vehicle 102*a* may be inversely proportional to a distance of the second vehicle 102*b* from respective audio-input device of the first vehicle 102*a* that captures the sound signal. For instance, referring back to FIG. 4, the second distance 404*b* (such as "b") between the second vehicle 102*b* and the audio-input device 110*c*, may be greater than the first distance 404*a* and third distance 404*c* respectively (such as "a" and "c"). Accordingly, the second sound signal 502*b*, which may correspond to the second distance 404*b*, may reach the first vehicle 102*a* after both the first sound signal 502*a* and the third sound signal 502*c* may have reached the first vehicle 102*a*. Further, the first sound signal 502*a* may arrive ahead of the third sound signal 502*c*, in case the first distance 404*a* is less than the third distance 404*c*, and vice versa.

In accordance with an embodiment, the ECU 108 may determine a relative distance of a same sound beam, such as the first sound beam 308*a* in this case, emanated from the second vehicle 102*b*, as received by the audio input devices 110*a*, 110*b*, and 110*c*, of the first vehicle 102*a*. Thus, the ECU 108 may determine a difference among relative distances of the second vehicle 102*b* from the audio input device 110*b* (the first distance 404*a*), the audio input device 110*c* (the second distance 404*b*), and the audio input device 110*a* (the third distance 404*c*). To that end, in accordance with an embodiment, the ECU 108 may determine a difference between relative times of arrival of the three sound signals 502*a* to 502*c* at the first vehicle 102*a*. Further, the ECU 108 may determine a direction associated with a position of the second vehicle 102*b* with respect to the first vehicle 102*a* based on amplitude and/or direction of emission of each of the three sound signals 502*a* to 502*c*. Thereafter, the ECU 108 may determine the first distance 404*a*, the second distance 404*b*, and the third distance 404*c* (represented by "a", "b", and "c") by application of a time difference of arrival (TDOA) technique and/or a triangulation technique. Further, the ECU 108 may determine a shortest distance between the second vehicle 102*b* and the first vehicle 102*a* based on the determined first distance 404*a*, the second distance 404*b*, and the third distance 404*c*. The shortest distance between the second vehicle 102*b* and the first vehicle 102*a* may correspond to a perpendicular distance between a front end of the second vehicle 102*b* and a rear end of the first vehicle 102*a*.

In accordance with an embodiment, the ECU 108 may further use the one or more ultrasonic sensors associated with the sensing system 220 of the first vehicle 102*a* to re-estimate the determined perpendicular distance between the first vehicle 102*a* and the second vehicle 102*b*. The ECU 108 may re-estimate the perpendicular distance between the first vehicle 102*a* and the second vehicle 102*b* to improve the accuracy of the previously determined perpendicular distance. The one or more ultrasonic sensors, under the command of the ECU 108, may transmit one or more electromagnetic signals (such as ultrasonic waves) towards the determined direction of the second vehicle 102*b*. Thereafter, the one or more ultrasonic sensors may receive back one or more reflected electromagnetic signals (such as reflected ultrasonic waves) from the second vehicle 102*b*. Based on a time elapsed between the transmission of the one or more electromagnetic signals and the receipt of the one or more reflected electromagnetic signals, the ECU 108 may re-estimate the perpendicular distance between the second vehicle 102*b* and the first vehicle 102*a*. The ECU 108 may also re-estimate the first distance 404*a*, the second distance 404*b*, and the third distance 404*c*, in a manner similar to the re-estimation of the perpendicular distance. The one or more electromagnetic signals may be transmitted in directions associated with the respective distances from the first vehicle 102*a* to the second vehicle 102*b*.

In accordance with an embodiment, the ECU 108 may determine speed of the one or more other vehicles (such as the second vehicle 102*b*, the third vehicle 102*c*, and the fourth vehicle 102*d*) based on the sound data captured from the respective vehicles. Further, the ECU 108 may determine the relative velocity of the second vehicle 102*b* with respect to the first vehicle 102*a*, based on the sound data captured from the second vehicle 102*b*. For example, difference in the amplitude or pitch of the sound signals captured by the audio-input devices 110*a*, 110*b*, and 110*c*, and/or the determined TDOA may be utilized for the determination of speed and/or the relative velocity. Alternatively, the ultrasonic sensors (when present) may further be used for determination of the speed and/or relative velocity, when the speed of the first vehicle 102*a* is known (based on an instantaneous speedometer reading).

In accordance with an embodiment, the ECU 108 may be further configured to calculate the angle 406 (represented by angle "A") at which the second vehicle 102*b* is positioned with respect to the audio-input devices 110*b* (at the left side) and the audio-input device 110*c* (at the right side) of the first vehicle 102*a*. That is, the angle 406 (represented by angle "A") may correspond to the angle formed between the lines that corresponds to the first distance 404*a* and the second distance 404*b* (represented by sides "a" and "b") of the triangle "bay". The angle 406 (represented by angle "A") may be calculated based on the following mathematical expression for the triangle "bay":

$$A = \cos^{-1}\left(\frac{(b^2 + y^2 - a^2)}{2by}\right) \quad (1)$$

In accordance with an embodiment, after calculation of the angle 406 (represented by angle "A"), the ECU 108 may perform a beam-forming procedure by transmission of directed sound beams towards the detected second vehicle 102*b* based on the calculated angle 406. The transmitted directed sound beams may be reflected from the second vehicle 102*b*. The reflected sound beams may be captured by the two or more audio capture devices 110. Based on analysis of the captured reflected sound beams, the ECU 108 may estimate the relative distance between the first vehicle 102*a* and the second vehicle 102*b*. An exemplary embodiment of the beam-forming procedure is explained in conjunction with FIG. 8.

In accordance with an embodiment, the determined relative distance and angle information of the second vehicle 102b with respect to the first vehicle 102a, when obtained, may be used by the ECU 108 to generate the virtual sound for the second vehicle 102b. In accordance with an embodiment, the ECU 108 may convert the determined distance and angle of the second vehicle 102b with respect to the first vehicle 102a, from a Euclidean coordinate system to a spherical coordinate system. The distance and angle information, represented in the spherical coordinate system, may be used to apply a head-related transfer function (HRTF). The ECU 108 may generate the virtual sound by applying the HRTF by use of the below mentioned mathematical expression:

$$H_L(r, \theta, \phi, f, a) = \frac{P_L(r, \theta, \phi, f, a)}{P_0(r, f)}, \qquad (2)$$

$$H_R(r, \theta, \phi, f, a) = \frac{P_R(r, \theta, \phi, f, a)}{P_0(r, f)}$$

Where HRTF is measured in terms of the distance and the angle of the first vehicle 102a from a sound source (such as the second vehicle 102b), represented in spherical coordinates $(r, \theta, \phi)$), and where,
"r" represents source distance relative to the head center;
"$\theta$" represents horizontal plane from "0 to 360" degrees
"$\phi$" represents elevation between "−90 to 90" degrees denoting regions below and above to the head center;
"f" represents different frequencies;
"a" represents individual head;
"$P_L$" and "$P_R$" represent sound pressures at left and right ears, such as sound reproduced from the first set of audio-output devices 226a and 226b; and
"$P_0$" represents sound pressure at head center with head absent.

In accordance with an embodiment, the ECU 108 may apply one or more sound filters on the first sound beam 308a, which may be captured by the audio-input devices 110a to 110c as constituent signals of the sound signal pattern 500. Based on the application of the one or more sound filters, the ECU 108 may determine a sound signature associated with the second vehicle 102b. The ECU 108 may then compare the determined sound signature of the second vehicle 102b with pre-stored sound signatures in the memory 204. The pre-stored sound signatures may correspond to vehicles and objects of various types. Examples of types of the vehicles may include, but not limited to, four wheelers, three wheelers, two wheelers, trucks, cars, SUVs, and/or multi-utility vehicles. Objects other than vehicles may include, but not limited to, humans, animals, and/or other sound producing objects. Based on the comparison, the ECU 108 may determine the type of the second vehicle 102b.

In accordance with an embodiment, the virtual sound associated with the second vehicle 102b may be generated based on the determined type of the second vehicle 102b. For instance, the pitch and frequency of the virtual sound output in the first vehicle 102a may be based on the determined type of the second vehicle 102b. Pitch and frequency values to be used for generation of the virtual sound output for vehicles and objects of various types may be stored along with the sound signatures in the memory 204. Thus, the ECU 108 may extract the pitch and frequency values of the vehicle type determined for the second vehicle 102b from the memory 204. Thereafter, the ECU 108 may accordingly generate the virtual sound output of the relevant pitch and frequency value(s) extracted from the memory 204 for the second vehicle 102b. The resultant virtual sound output may enable the driver 114 to easily understand where to focus to drive safely in a crowded traffic area along the road portion (such as the road portion 306 or the road portion 118).

In accordance with an embodiment, based on the application of the one or more sound filters in the captured sound, the ECU 108 may also determine one or more driving parameters associated with the second vehicle 102b. For instance, the ECU 108 may determine a currently applied engine gear by the second vehicle 102b, based on the application of the one or more sound filters. The pitch and/or frequency of the virtual sound output may also be based on the currently applied gear by the second vehicle 102b, as determined by the ECU 108. In accordance with an embodiment, an amplitude value of the virtual sound output may be proportional to the distance and/or relative velocity of the second vehicle 102b from the first vehicle 102a. Further, the virtual sound output associated with the second vehicle 102b may include a pre-recorded audio track associated with a vehicle type of the second vehicle 102b. Alternatively, the virtual sound output may include at least a recorded portion of the sound captured from the second vehicle 102b, in real-time or near real-time. The in-vehicle alert including the virtual sound of the second vehicle 102b may then be reproduced through the second set of audio-output devices 228a and 228d or the first set of audio output devices 226a and 226b.

FIG. 6 illustrates a second exemplary top view of a road portion that depicts capture of traffic sound emanated from vehicles in vicinity of a first vehicle, in accordance with an embodiment of the disclosure. FIG. 6 is explained in conjunction with FIGS. 1 and 2. With reference to FIG. 6, there is shown a top view 600 of a road portion 606 that may include a first lane 602 and a second lane 604. Multiple vehicles are shown to traverse the road portion 606 such as the first vehicle 102a, a car 608a, a trailer 608b, a truck 608c, a bike 608d, a bike 608e, and a car 608f. The car 608a and the trailer 608b are shown to traverse along the first lane 602, while the truck 608c, the bike 610d, the first vehicle 102a, the bike 608e, and the car 608f are shown to travel along the second lane 604 in opposite direction.

The first vehicle 102a is shown to include the two or more audio-input devices such as 110a to 110h. Further, a first set of sound beams 610a, a second set of sound beams 610b, and a third set of sound beams 610c are shown as being respectively emanated from the truck 608c, the bike 608d, and the car 608a, towards the first vehicle 102a. The audio-input devices 110e, 110a, and 110f are shown as installed at the back-left, back, and back-right end of the first vehicle 102a. Each of the aforementioned three audio-input devices 110e, 110a, and 110f may capture individual directed sound beams within the first set of sound beams 610a, the second set of sound beams 610b, and the third set of sound beams 610c. For instance, the first set of sound beams 610a may include three directed sound beams. A first of the three sound beams may be directed towards the back-left end of the first vehicle 102a and thus may be captured by the audio-input device 110e that is installed at the back-left end of the first vehicle 102a. Similarly, a second and a third of the three sound beams may be directed towards the back-center end and the back-right end of the first vehicle 102a. The second sound beam of the first set of sound beams 610a may be captured by the audio-input device 110a (at back end), while the third sound beam of the first set of sound beams may be captured by the audio-input device 110f (at back-right end).

Figure 7:
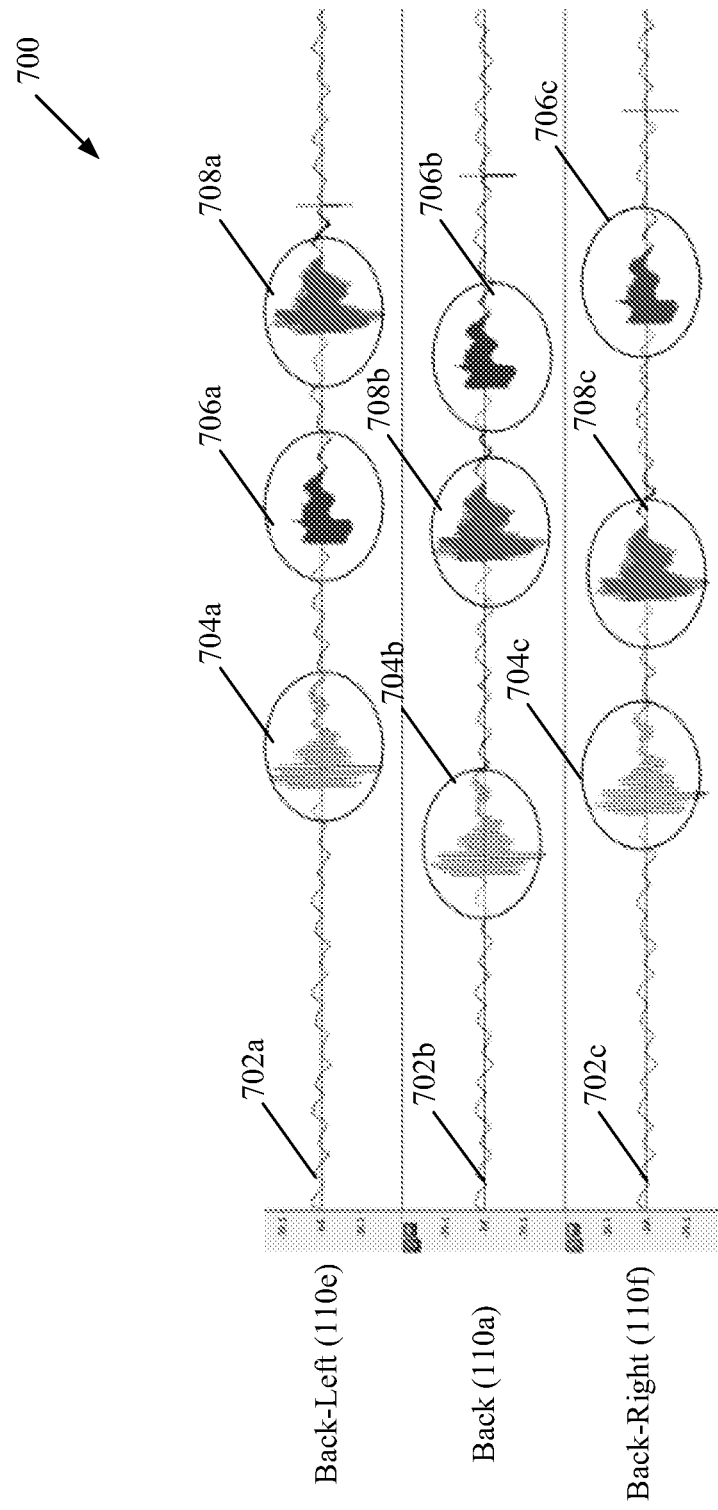
FIG. 7 illustrates a second exemplary pattern of traffic sound data captured from one or more nearby vehicles by a first vehicle for determination of relative position of a nearby vehicle with respect to the first vehicle, in accordance with an embodiment of the disclosure.

FIG. 7 illustrates a second exemplary pattern of traffic sound data captured from one or more nearby vehicles by a first vehicle for determination of relative position of a nearby vehicle with respect to the first vehicle, in accordance with an embodiment of the disclosure. FIG. 7 is explained in conjunction with FIGS. 1, 2, and 6. With reference to FIG. 7, there is shown a first signal stream 702a, a second signal stream 702b, and a third signal stream 702c. Further, there is shown a set of first vehicle-type signals 704a to 704c, a set of second vehicle-type signals 706a to 706c, and a set of third vehicle-type signals 708a to 708c.

The first signal stream 702a may correspond to the audio signals captured by the audio-input device 110e, installed at the back-left end of the first vehicle 102a, as shown in FIG. 7. Similarly, the second signal stream 702b and the third signal stream 702c may correspond to the audio signals captured by the audio-input devices 110a and 110f, which are installed at the back-center and the back-right end of the first vehicle 102a. For the sake of explanation, the set of first vehicle-type signals 704a to 704c is considered to include the first set of sound beams 610a captured from the truck 608c. Further, the set of second vehicle-type signals 706a to 706c are considered to include the second set of sound beams 610b captured from the car 608a and the bike 608d. In addition, the set of third vehicle-type signals 708a to 708c are considered to include the third set of sound beams 610c captured from the bike 608d.

In operation, to determine the vehicle nearest to the first vehicle 102a, the ECU 108 may identify a signal stream that includes the earliest occurrence of vehicle-type signals. That is, the ECU 108 may check as to which of the audio-input devices first captured a sound beam emanated from a nearby vehicle. For instance, as shown in FIG. 7, the second signal stream 702b corresponding to the back-center audio input device 110a received the earliest vehicle-type signals (that is, signals 704b from the first set of sound beams 610a). Thereafter, the ECU 108 may correlate the other signals of the same vehicle-type received at the other audio-input devices. For instance, in the above case, signals 704a and 704c of the first vehicle-type (also from the first set of sound beams 610a) may be correlated with the signals 704b (the earliest received signals), as these are captured from the same vehicle (i.e., the truck 608c).

Based on the correlation of the signals related to the same vehicle, the start position of the signals received from that vehicle at the other audio-input devices may be identified. For instance, the start positions of the reception of the signals of the truck 608c in the first signal stream 702a and the third signal stream 702c may be identified based on the correlation of the set of first vehicle-type signals 704a to 704c. Further, based on the identification of the start positions, signal delays may be determined. For instance, the delay of the signals 704a and 704c with respect to each other and with respect to the signals 704b may be determined. Based on the determined delays, a relative angle of approach of the identified nearest vehicle (e.g., the truck 608c) with respect to the first vehicle 102a may be determined. Similarly the relative angle of the first vehicle 102a with respect to the other nearby vehicles may also be determined. An alternate embodiment of the determination of the relative angle of the nearest vehicles is explained in FIG. 4. In accordance with an embodiment, the ECU 108 may perform a beam-forming based determination of the relative position of the nearest identified vehicle (e.g., the truck 608c). The beam-forming may be performed along the determined relative angle of approach of the nearest vehicle (e.g., the truck 608c) with respect to the first vehicle 102a. An exemplary beam-forming procedure is explained further in conjunction with FIG. 8.

Figure 8:
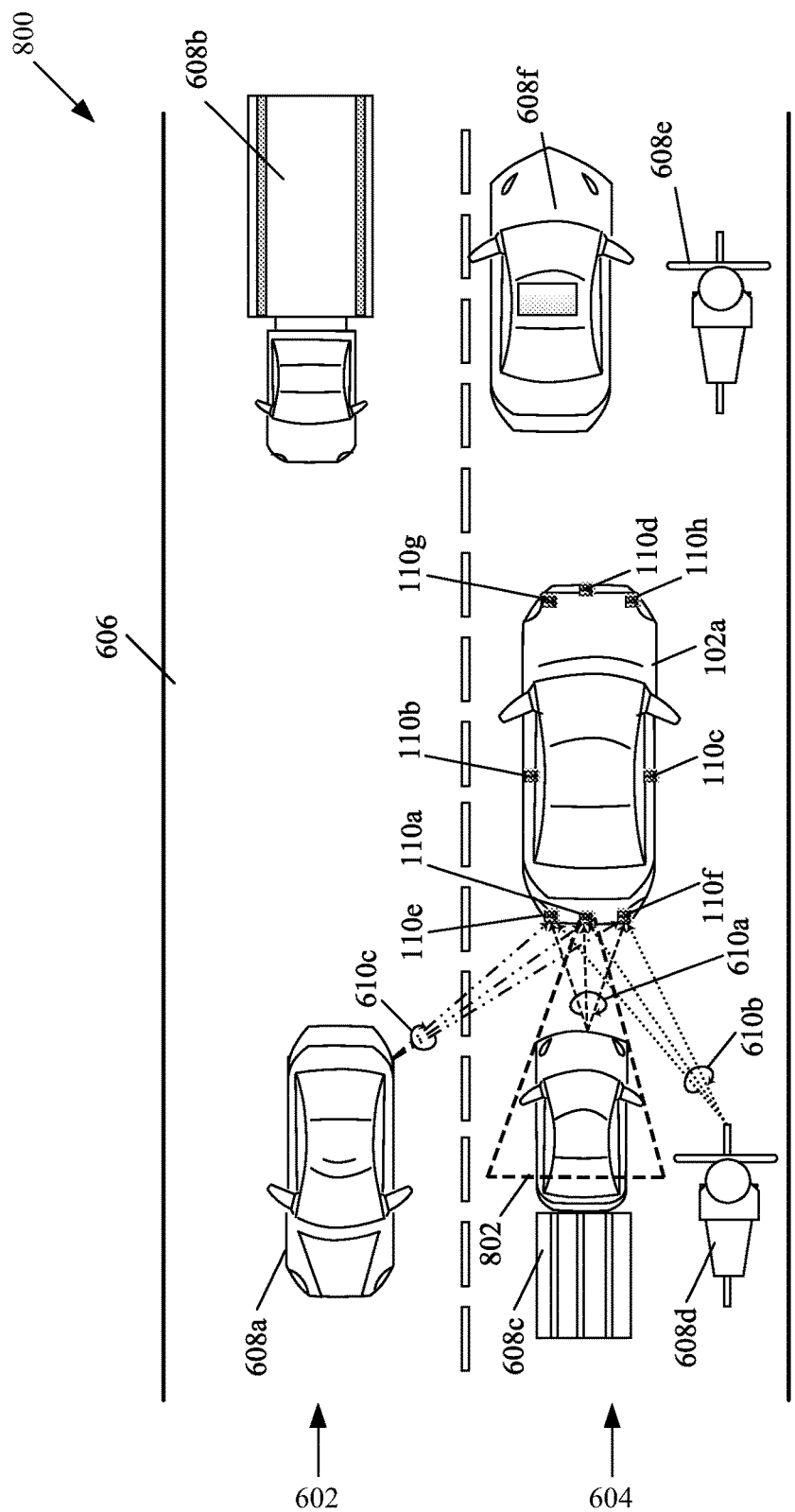
FIG. 8 illustrates an exemplary beam forming procedure performed by a first vehicle to ascertain relative position of a nearby vehicle with respect to the first vehicle, in accordance with an embodiment of the disclosure.

FIG. 8 illustrates an exemplary beam forming procedure performed by a first vehicle to ascertain relative position of a nearby vehicle with respect to the first vehicle, in accordance with an embodiment of the disclosure. FIG. 8 is explained in conjunction with elements from FIGS. 1, 2, 6 and 7. With reference to FIG. 8, there are shown a top view 800 of the road portion 606 that may include the first lane 602 and the second lane 604, as also shown in FIG. 6. Further, the car 608a and the trailer 608b are shown to travel in the first lane 602, while the truck 608c, the bike 608d, the first vehicle 102a, the bike 608e and the car 608f are shown to traverse the second lane 604. Similar to FIG. 6, vehicles in the first lane 602 travel in the opposite direction with reference to vehicles in the second lane 604.

Similar to FIG. 6, the first vehicle 102a is shown to include the two or more audio-input devices 110a to 110h. As shown in FIG. 8, the audio-input devices 110e, 110a, and 110f may be installed at back-right, back-center, and back-left end of the first vehicle 102a to capture sound beams emanated from the nearby vehicles. The nearby vehicles, such as the car 608a, the truck 608c, and the bike 608d, may emanate sound beams towards the audio-input devices 110e, 110a, and 110f. For instance, the car 608a, the truck 608c, and the bike 608d may emanate the first set of sound beams 610a, the second set of sound beams 610b, and the third set of sound beams 610c, as shown in FIG. 8. An exemplary embodiment of the analysis of the patterns of sound beams captured from the nearby vehicles is explained in conjunction with FIG. 7. Based on the analysis of the patterns of the captured sound beams, the nearest vehicle (e.g., the truck 608c) and the relative angle of approach of the nearest vehicle with respect to the first vehicle 102a may be determined, as explained in conjunction with FIG. 7.

In accordance with an embodiment, the ECU 108 may perform beam-forming along the determined relative angle of approach of the nearest vehicle (e.g., the truck 608c). The beam-forming may be performed by projecting directed beams (e.g., directed sound beams or directed millimeter-wave radio beams) towards the determined relative angle of approach of the nearest vehicle (e.g., the truck 608c) by the first vehicle 102a. The audio-input devices 110e, 110a, and 110f of the first vehicle 102a may receive beams that bounce-back or reflect from the nearest vehicle (e.g., the truck 608c). Based on the received beams, the ECU 108 may determine the relative position of the nearest vehicle (e.g., the truck 608c) from the first vehicle 102a. Beam-forming performed with respect to the truck 608c has been depicted in FIG. 8 by the rays 802.

Figure 9A:
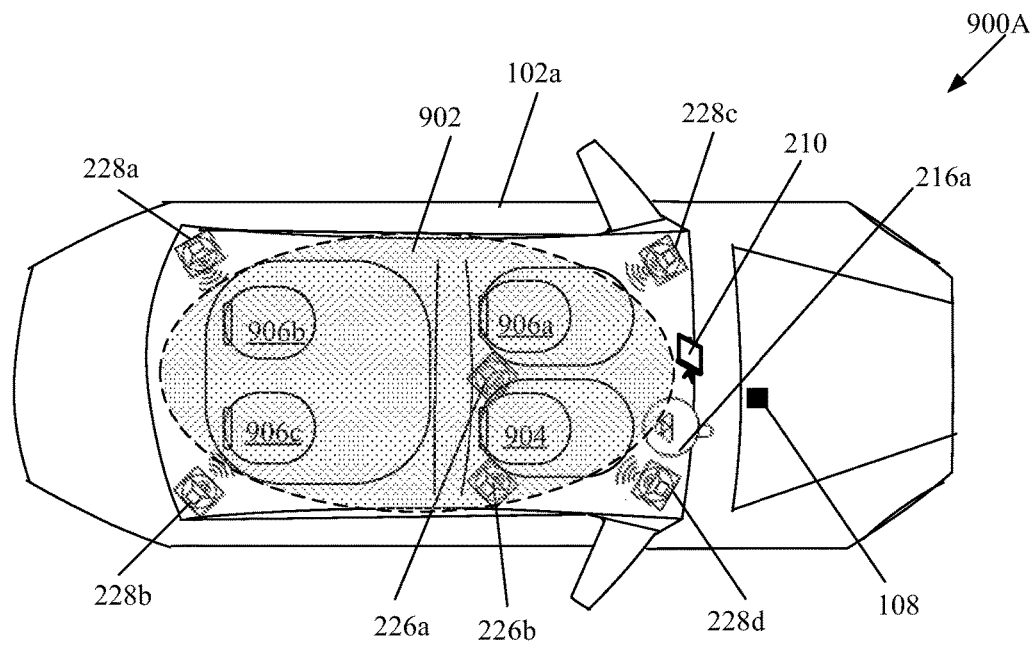
FIGS. 9A and 9B illustrate two exemplary top views of an interior of a first vehicle that depict reproduction of virtual sound of a second vehicle or other objects in a traffic area, in accordance with an embodiment of the disclosure.
Figure 9B:
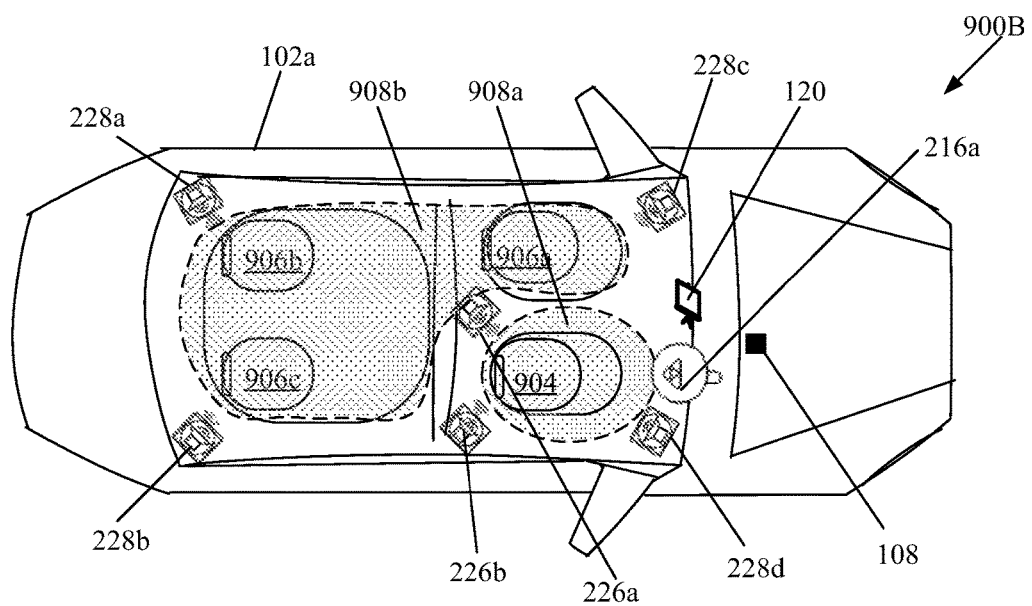

FIGS. 9A and 9B illustrate two exemplary top views of an interior of the first vehicle 102a that depict reproduction of virtual sound of the second vehicle 102b or other objects in a traffic area, in accordance with an embodiment of the disclosure. FIGS. 9A and 9B are explained in conjunction with elements from FIGS. 1 to 8. With reference to FIG. 9A, a first top view 900A of an interior of the first vehicle 102a is shown to include a first sound field 902, a driver seat 904, one or more co-passenger seats 906a to 906c, a steering wheel 216a, and the ECU 108. There is further shown the first set of audio-output devices 226a and 226b for the driver 114 and the second set of audio-output devices 228a to 228d for the driver 114 and all co-passengers of the first vehicle 102a. FIG. 9A further shows the display screen 210.

In operation, the ECU 108 may be configured to determine the distance between the first vehicle 102a and at least the second vehicle 102*b*, based on the determined position and angle of the second vehicle 102*b* from the first vehicle 102*a*. The distance may be determined based on received sound data that corresponds to sound emanated from other vehicles including at least the second vehicle 102*b* and objects in the traffic area of the first vehicle 102*a*. The determination of the distance between the first vehicle 102*a* and the second vehicle 102*b* is explained in FIGS. 4 and 5 (refer expression 1). Further, the ECU 108 may apply the HRTF (refer expression 2) to generate the virtual sound of the second vehicle 102*b*, as an in-vehicle alert, through one or more sound reproduction devices in the first vehicle 102*a*. The virtual sound may be reproduced at one or more locations within the first vehicle 102*a* to control or create sound fields for the driver 114 or both the driver 114 and the co-passenger(s), as explained below.

In accordance with an embodiment, the second set of audio-output devices 228*a* to 228*d* may reproduce the virtual sound output of the in-vehicle alert generated by the ECU 108 to all the passengers of the first vehicle 102*a*. As shown in FIG. 9A, the each audio-output device in the second set of audio-output devices 228*a* to 228*d* may contribute to creation of the virtual sound output represented by the first sound field 902. The second set of audio-output devices 228*a* to 228*d* may be installed at four corners of the first vehicle 102*a*. For instance, the audio-output devices 228*a* and 228*b* may be installed at the rear corners of the first vehicle 102*a* to reproduce sound for passengers seated at the rear passenger seats 906*b* and 906*c*, respectively. Further, the audio-output devices 228*c* and 228*d* may be installed at the front corners of the first vehicle 102*a* to reproduce sound for a front co-passenger seated at the seat 906*a* and the driver 114 seated at the driver seat 904. Thus, the first sound field 902 created by second set of audio-output devices 228*a* to 228*d* may be audible to the driver 114 seated at the driver seat 904 and the co-passengers seated at the co-passenger seats 906*a* to 906*c*.

In accordance with an embodiment, the in-vehicle alert may be reproduced through the first sound field 902 based on a traffic condition of the traffic area associated with the first vehicle 102*a*. For instance, in case of an accident warning or where another vehicle is approaching at high speed towards (or is within a predetermined proximity to) the first vehicle 102*a*, the in-vehicle alert may be reproduced through the first sound field 902 for all the passengers. Further, the in-vehicle alert may be reproduced as the first sound field 902 in certain driving conditions such as at night, during fog, and/or rush hours. During normal driving conditions, the in-vehicle alert may be generated only for the driver 114 as explained in FIG. 9B, without disturbing other co-passengers in the first vehicle 102*a*.

With reference to FIG. 9B, a second top view 900B of an interior of the first vehicle 102*a* is shown to include a second sound field 908*a*, a third sound field 908*b*, the driver seat 904, the one or more co-passenger seats 906*a* to 906*c*, the steering wheel 216*a*, and the ECU 108. Further, FIG. 9B illustrates the first set of audio-output devices 226*a* and 226*b*, the second set of audio-output devices 228*a* to 228*d*, and the display screen 210.

In operation, the in-vehicle alert, which may include the virtual sound representative of sound emanated from the second vehicle 102*b*, may be reproduced only for the driver 114 of the first vehicle 102*a*, to assist the driver 114. The co-passengers of the first vehicle 102*a* may not be provided with the in-vehicle alert and may either hear no sound or may listen to music played out through a music system (or the infotainment system 208) of the first vehicle 102*a*. That is, the co-passengers may not be disturbed with in-vehicle alerts and may continue to enjoy music or may not hear sound at all. This may be the case in normal driving conditions, where sufficient distance is maintained between the vehicles, traffic rules are followed, and/or there is no eminent threat, or obstacle.

For example, the first set of audio-output devices 226*a* and 226*b* may reproduce the in-vehicle alert directed towards the driver 114 seated at the driver seat 904. As shown in FIG. 9B, each of the first set of audio-output devices 226*a* and 226*b* may contribute to creation of the second sound field 908*a* directed towards the driver 114. The first set of audio-output devices 226*a* and 226*b* may be installed on or around the driver seat 904 to provide a binaural sound output to the driver 114. The binaural sound output may correspond to the second sound field 908*a* including the virtual sound output of the in-vehicle alert.

In accordance with an embodiment, the one or more co-passengers of the first vehicle 102*a*, seated at the seats 906*a* to 906*c*, may be provided a separate sound output, such as the third sound field 908*b*. The third sound field 908*b* may include a music track or infotainment channel reproduced for the one or more co-passengers by use of a music system or the infotainment system 208 of the first vehicle 102*a*. The ECU 108 by use of the one or more audio-output devices of the second set of audio-output devices 228*a* to 228*d* may control or create the third sound field 908*b* for the co-passengers of the first vehicle 102*a*. For instance, the audio output devices 228*a* to 228*c* may reproduce the third sound field 908*b* for the co-passengers seated at the seats 906*b*, 906*c*, and 906*a*, respectively. Alternatively, the third sound field 908*b* may not be reproduced and the co-passengers may not hear any sound at all.

In accordance with an embodiment, the reproduction of sound fields within the interior of the first vehicle 102*a* may switch automatically based on an assessment of a traffic condition by the ECU 108. For instance, the ECU 108 may continue to determine distances of the one or more other vehicles from the first vehicle 102*a*. Based on a change in traffic condition, such as the detection of a speeding vehicle approaching the first vehicle 102*a*, the ECU 108 may switch to generation of the first sound field 902 (of FIG. 9A). In accordance with an embodiment, the ECU 108 may also switch to generation of the first sound field 902 when a specific type of vehicle (such as a truck or a long trailer) is within the pre-determined proximity of the first vehicle 102*a*. However, in normal driving conditions, the ECU 108 may continue to generate the second sound field 908*a* and/or the third sound field 908*b* (in case the infotainment system 208 is in use by the co-passengers) of FIG. 9B. In accordance with an embodiment, preferences to create a particular sound field (from the first sound field 902 and the second sound field 908*a*) to reproduce the in-vehicle alert may be customizable by the driver 114 and/or the co-passengers of the first vehicle 102*a*, via an interface, such as the display screen 210 or via the infotainment system 208.

In accordance with an embodiment, the ECU 108 may generate in-vehicle alerts based on the determined distances of the other vehicles that lie within a pre-determined proximity from the first vehicle 102*a*. The generated in-vehicle alerts may include virtual sounds that may represent sound emanated from the particular vehicles that currently lie within the predetermined proximity from the first vehicle 102*a*. In accordance with an embodiment, the generated in-vehicle alerts may also include a combination of two or more virtual sound outputs based on the determined distances of the other vehicles. The reproduction of each such virtual sound output may depend on the type of the respective vehicle. Thus, the virtual sound outputs of distinct vehicles may seem distinctly identifiable by the driver 114 such that the driver 114 may assess the type of the vehicle, proximity, or speed, and drive accordingly. In accordance with an embodiment, an indication of the other vehicles in the predetermined proximity of the first vehicle 102a may be displayed through the display screen 210. A user such as the driver 114 or a passenger may be able to track the movement of the other vehicles on a map based on the indication displayed through the display screen 210.

In accordance with an embodiment, the ECU 108 may determine a relative velocity (with respect to the first vehicle 102a) of the one or more other vehicles in the plurality of vehicles 102 including at least the second vehicle 102b. The determination of the relative velocity of another vehicle, such as the second vehicle 102b, may also be based on the captured sound emanated from that vehicle and the associated distance determined therefrom, as explained above in FIGS. 4 and 5. Based on the determined distance and/or the relative velocity of a particular other vehicle, such as the second vehicle 102b, the ECU 108 may generate an audio warning. The audio warning may be included within the in-vehicle alert. For instance, when another vehicle that lies within a particular distance from the first vehicle 102a approaches the first vehicle 102a with a relative velocity exceeding a particular threshold velocity, the audio warning may be generated along with the in-vehicle alert. The driver 114 may then become aware of the speeding vehicle. In accordance with an embodiment, the audio warning may be reproduced through the first sound field 902. In such a scenario, the in-vehicle alert may be switched from the second sound field 908a to the first sound field 902, if not already so. Alternatively, the audio warning may be reproduced only to the driver 114 through the second sound field 908a irrespective of current use of the first sound field 902 for reproduction of the in-vehicle alert. Hence, in this case, the audio warning may be exclusively provided to the driver 114.

In accordance with an embodiment, the sound emanated from the second vehicle 102b may be captured as a direct sound beam at the first vehicle 102a. This may be the case when the second vehicle 102b may be within a line-of-sight (LOS) associated with the first vehicle 102a. However, in case the second vehicle 102b is not in a direct LOS of the first vehicle 102a, the sound emanated from the second vehicle 102b may be captured as an indirect or reflected (multi-path) sound beam at the first vehicle 102a. The ECU 108 may still determine the distance between the first vehicle 102a and the second vehicle 102b by use of the TDOA and/or triangulation techniques, based on the captured indirect sound of the second vehicle 102b, as explained above. Hence, even in cases where the second vehicle 102b may not be directly visible or when the second vehicle 102b may lie in a driving blind spot of the driver 114, the second vehicle 102b may be detected and located. Further, the ECU 108 may generate the in-vehicle alert for the driver 114, based on a predetermined proximity and/or relative velocity of the second vehicle 102b with respect to the first vehicle 102a. In a case when multiple vehicles are present within the pre-determined proximity of the first vehicle 102a and/or one or more others vehicle approach the first vehicle 102a with a high relative velocity, the ECU 108 may generate appropriate virtual sounds and/or alerts messages as part of the in-vehicle alert. Each of the virtual sound outputs may be specific to the specific detected vehicles, based on the type of the respective vehicles, their respective distances, and/or relative velocities with respect to the first vehicle 102a. Thus, the driver 114 may be able to distinctly identify the various vehicles around the first vehicle 102a in the current driving scenario and appropriately maneuver the first vehicle 102a.

In accordance with an embodiment, the ECU 108 may be further configured to communicate statistical data of the traffic condition in the traffic area to a remote control center at a second location, such as a traffic monitoring center, for traffic management and control. For instance, the ECU 108 may transmit the statistical data in real time or periodically to the cloud server 104, via the wireless communication network 106. In accordance with an embodiment, the transmission of the statistical data to the cloud server 104 may be via the RSU 120 installed along the road portion 118 (of FIG. 1). Alternatively, the ECU 108 may transmit the statistical data directly to the cloud server 104.

In accordance with an embodiment, the cloud server 104 may be configured to compile such statistical data received from the plurality of vehicles 102 and analyze trends associated with the traffic condition in the traffic area over a period of time. Further, the compiled data may be used for analysis of accidents and driving behavior of the public at large. The ECU 108 may also transmit the statistical data to an electronic device of a user of the first vehicle 102a, such as the driver 114. Examples of the electronic device may include, but not limited to, a smartphone, a laptop, a personal computer, a tablet computer, a wearable device, and/or an Internet-of-Things (IoT) device that may be connected to a vehicle network. Example of the statistical data may include, but not limited to, distance of the second vehicle 102b from the first vehicle 102a, a relative velocity of the second vehicle 102b with respect to the first vehicle 102a, and/or the type of the second vehicle 102b. The statistical data may further include a count of the one or more other vehicles within a pre-determined distance (or pre-determined proximity) from the first vehicle 102a, and the generated in-vehicle alerts.

In accordance with an embodiment, the cloud server 104 may use the statistical data, related to the traffic condition, received from the ECU 108 of the first vehicle 102a for other non-transportation implementations. For instance, multiple vehicles including the plurality of vehicles 102, may implement the ECU 108, in a manner similar to the first vehicle 102a. The cloud server 104 may receive such traffic condition related statistical data from the multiple vehicles (such as the plurality of vehicles 102) for a period of time. The cloud server 104 may also receive corresponding virtual sound output generated by the multiple vehicles (such as the plurality of vehicles 102) during a pre-defined period of time. The cloud server 104 may use the received statistical data related to the traffic conditions and the received corresponding virtual sound outputs to generate metadata associated with a particular road portion and set of vehicles (such as the plurality of vehicles 102). In accordance with an embodiment, the cloud server 104 may use the generated metadata in various application scenarios, such as virtual reality, augmented reality, gaming, driver training, control of autonomous vehicles, and/or training or enhancement of machine learning algorithms used for driving of autonomous vehicles.

In accordance with an embodiment, the ECU 108 may further be configured to display a representation of the second vehicle 102b and/or one or more objects in the traffic area of the first vehicle 102a, via the display screen 210. The display screen 210 may be associated with the infotainment system 208 of the first vehicle 102a. The display screen 210 may further display the statistical data of the traffic condition in the vicinity of the first vehicle 102a, which may also be transmitted to the cloud server 104, via the wireless communication system 206. For instance, the display screen 210 may illustrate virtual objects to represent the second vehicle 102b, the one or more objects, and/or the statistical data on a map associated with the traffic area.

In accordance with an embodiment, the image-capturing devices 112a to 112b may capture one or more images of the second vehicle 102b and the one or more objects. The display of the virtual objects on the display screen 210 may be controlled based on the recognition the one or more objects from the one or more images and the determined distances from the first vehicle 102a. Based on the identification of the type of object, and associated information, such as position, size, distance, from the first vehicle 102a, the ECU 108 may generate audio and/or visual information that may assist the driver 114 to drive correctly on the road portion 306.

Figure 10:
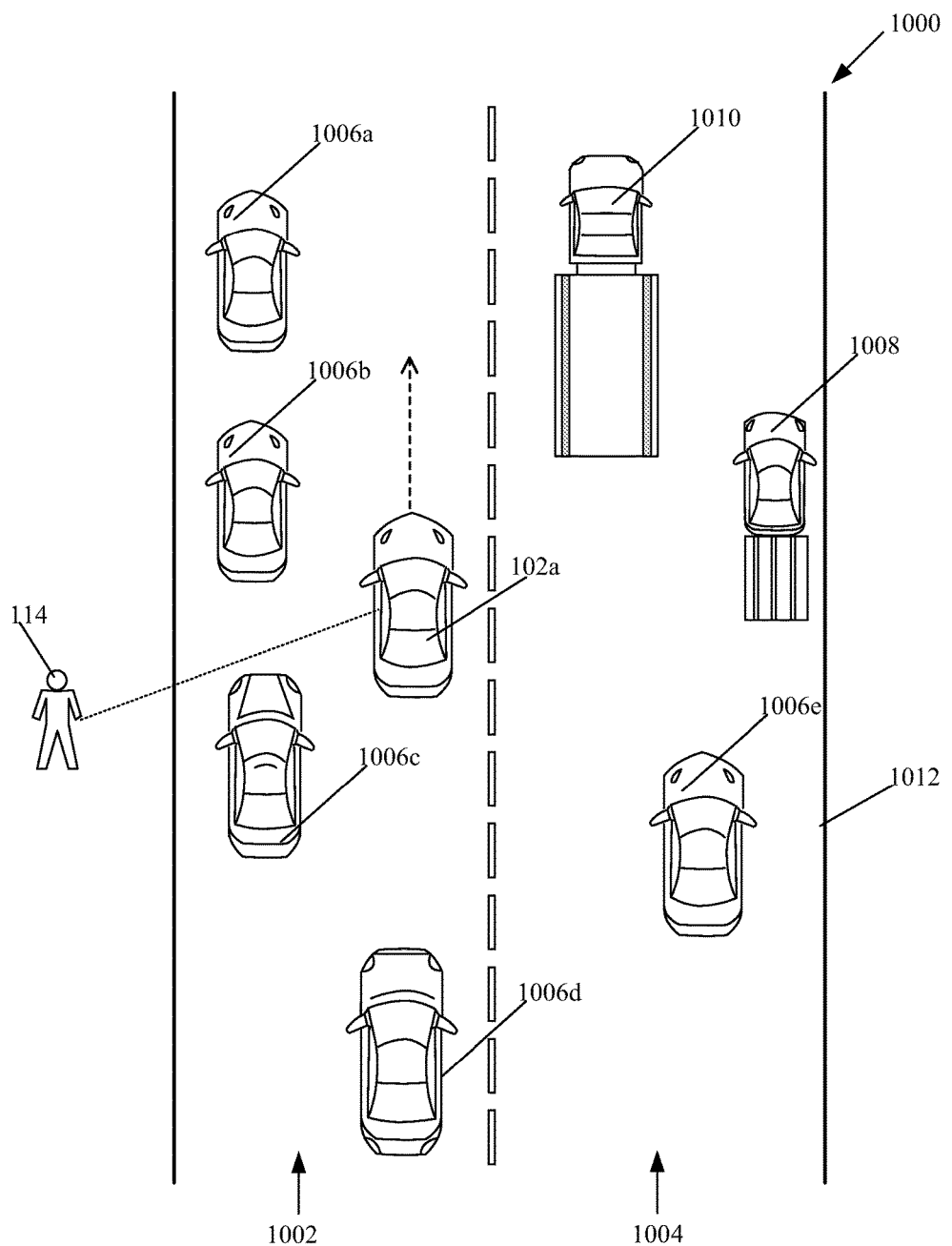
FIG. 10 illustrates a first exemplary traffic scenario to process traffic sound data to provide in-vehicle driver assistance, in accordance with an embodiment of the disclosure.

FIG. 10 illustrates a first exemplary traffic scenario to process traffic sound data to provide in-vehicle driver assistance, in accordance with an embodiment of the disclosure. FIG. 10 is explained with reference to elements from FIGS. 1 to 8, 9A, and 9B. With reference to FIG. 10, there is shown a top view of a first exemplary traffic scenario 1000. The first exemplary traffic scenario 1000 may include a first lane 1002 and a second lane 1004 in a road portion 1012. The first exemplary traffic scenario 1000 further include vehicles that travel along the road portion 1012 on the first lane 1002 or the second lane 1004. The vehicles in the first lane 1002 include the first vehicle 102a (such as a first car), a second car 1006a, a third car 1006b, a fourth car 1006c, and a fifth car 1006d. Further, the vehicles in the second lane 1004 include a sixth car 1006e, a truck 1008, and a trailer 1010. All the vehicles, including the first vehicle 102a, are shown to move in a forward direction, denoted by the arrow, on the first lane 1002 and the second lane 1004.

In FIG. 10, all the vehicles, such as the first vehicle 102a, the cars 1006a to 1006e, the truck 1008, and trailer 1010, are shown to move in their respective lanes without changing lanes. The first vehicle 102a is shown to overtake other vehicles, such as the fourth car 1006c and the third car 1006b (based on relative velocity of the first vehicle 102a with respect to the third car 1006b). Further, the truck 1008 and the trailer 1010 are shown to travel in a different lane, that is, the second lane 1004, different from that of the first vehicle 102a, which travels in the first lane 1002. Moreover, both the truck 1008 and the trailer 1010 may be at a safe distance from the first vehicle 102a. Thus, it may be evident that the first vehicle 102a may be following driving rules, in the current scenario. Further, the driving conditions may also be normal in the first exemplary traffic scenario 1000.

In operation, the ECU 108 may determine the distance and relative velocity of the first vehicle 102a with respect to the other vehicles that travel along the road portion 1012, based on a capture of sound emanated from the other vehicles. Based on the distance (and/or the relative velocity), the ECU 108 may determine the current traffic condition as a normal driving condition, as explained in the aforementioned. Hence, the in-vehicle alert may be reproduced by the first set of audio-output devices 226a and 226b in the second sound field 908a, thereby providing the in-vehicle alert only to the driver 114 of the first vehicle 102a. In accordance with an embodiment, the ECU 108 may continuously generate a pleasant sound (such as a music track or pre-defined tune) in the in-vehicle alert in a normal driving condition and/or when the traffic rules are followed. Further, the display screen 210 may display a virtual representation of the second car 1006a, the third car 1006b, and the fourth car 1006c, as these may correspond to the vehicles that may lie within the predetermined distance from the first vehicle 102a. When the ECU 108 is able to identify a particular vehicle based on the captured image of the vehicle, the ECU 108 may display that captured image of the vehicle on the map on the display screen 210, using the infotainment system 208.

Figure 11:
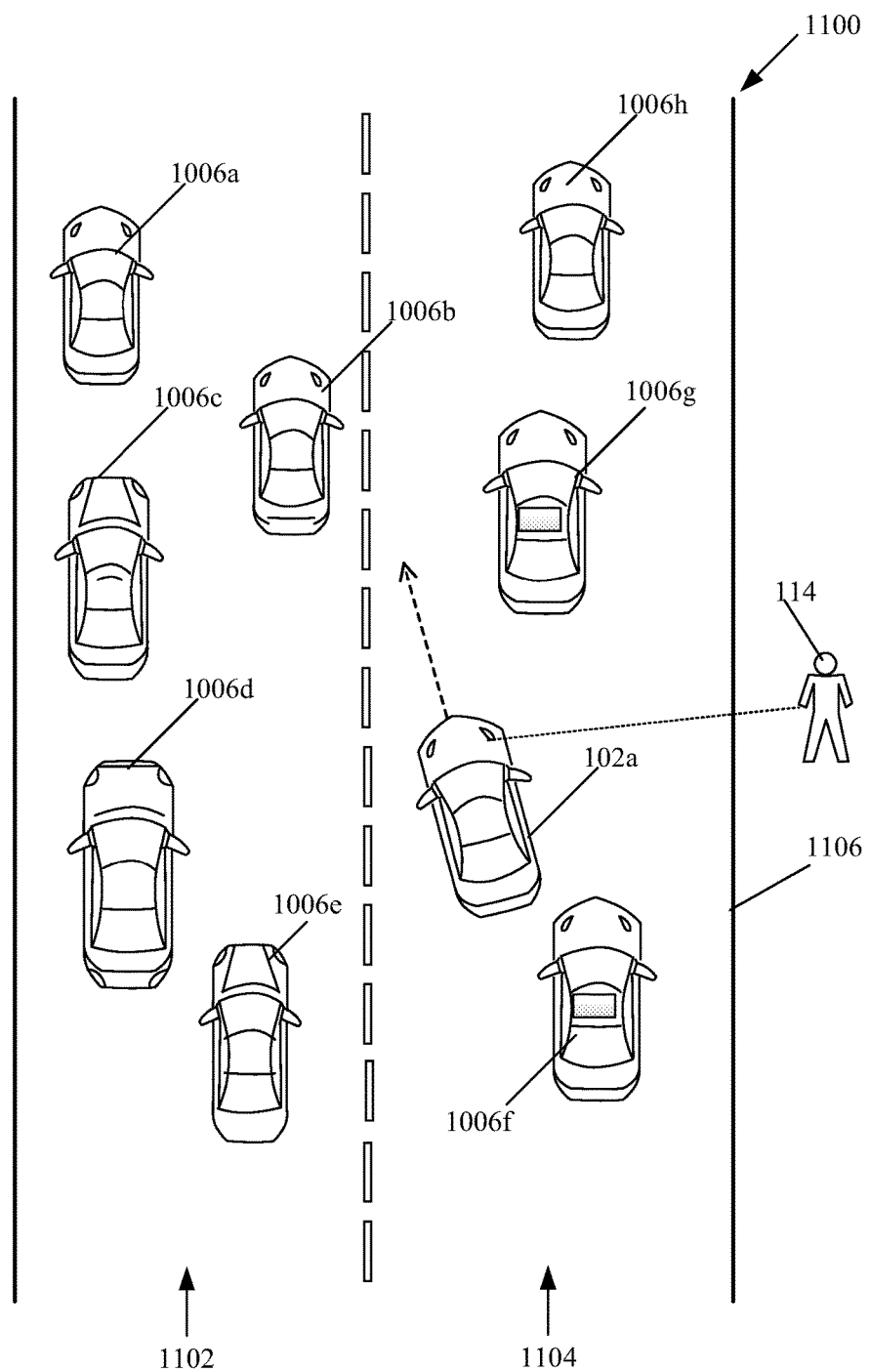
FIG. 11 illustrates a second exemplary traffic scenario to process traffic sound data to provide in-vehicle driver assistance, in accordance with an embodiment of the disclosure.

FIG. 11 illustrates a second exemplary traffic scenario to process traffic sound data to provide in-vehicle driver assistance, in accordance with an embodiment of the disclosure. FIG. 11 is explained with reference to elements from FIGS. 1 to 8, 9A, 9B, and 10. With reference to FIG. 11, there is shown a top view of a second exemplary traffic scenario 1100. The second exemplary traffic scenario 1100 may include a first lane 1102 and a second lane 1104 of a road portion 1106. The second exemplary traffic scenario 1100 further includes vehicles that travel along the road portion 1106 on the first lane 1102 or the second lane 1104. The vehicles in the first lane 1102 may include the second car 1006a, the third car 1006b, the fourth car 1006c, the fifth car 1006d, and the sixth car 1006e. Further, the vehicles in the second lane 1104 may include the first vehicle 102a (such as the first car), a seventh car 1006f, an eight car 1006g, and a ninth car 1006h.

All the vehicles except the first vehicle 102a, such as the cars 1006a to 1006h, are shown to move in a forward direction, in their respective lanes, on the road portion 1106. On the other hand, the first vehicle 102a is shown to change its lane from the second lane 1104 towards the first lane 1102, as depicted by a dashed arrow in FIG. 11. As may be evident from the second exemplary traffic scenario 1100, both the first lane 1102 and the second lane 1104 may be crowded with vehicles. Hence, overtaking other vehicles in such a traffic condition may not be recommended for safe driving. Further, a safe distance may be required to be maintained between the first vehicle 102a and the other vehicles that travel along the road portion 1106.

In operation, the ECU 108 may detect that the first vehicle 102a is changing lanes based on in-vehicle data extracted from the in-vehicle network 222 or one or more images captured by one or more of the image-capturing devices 112a to 112b. The audio-input devices 110a to 110h of the first vehicle 102a may capture sound emanated from various vehicles in the road portion 1106. Based on the received sound data, the ECU 108 may determine that the first vehicle 102a may lie within close proximity to one or more other vehicles that the first vehicle 102a may overtake (or may have overtaken). In addition, the ECU 108 may determine if the first vehicle 102a is overtaking other vehicles from a "wrong-side", which may be against the traffic rules. For instance, the seventh car 1006f may lie in close proximity to the first vehicle 102a. The first vehicle 102a may have overtaken past the seventh car 1006f from a "wrong-side", such as a left side. Further, the first vehicle 102a may begin to change its lane from the second lane 1104 to the first lane 1102, as shown in FIG. 11.

The ECU 108 may generate an audio warning associated with the close proximity to seventh car 1006f, in a manner similar to that discussed in FIG. 9B. The audio warning may be indicative of the wrongful overtaking and/or changing of lanes by the driver of the first vehicle 102a. In addition, if the ECU 108 detects that the relative velocity of the third car 1000b and the eight car 1000g with respect to the first vehicle 102a is less than a predetermined threshold, the ECU 108 may determine that the lane change may cause traffic blockage. Hence, the ECU 108 may again generate an audio warning indicating a potential traffic blockage situation due to the lane change. In accordance with an embodiment, the audio warning may be reproduced in the second sound field 908a directed exclusively towards the driver 114 of the first vehicle 102a. The audio warning may be included in the in-vehicle alert. In accordance with an embodiment, the audio warning may include recorded messages indicative of the traffic condition and/or incorrect driving by the driver of the first vehicle 102a. The audio warning may also include an unpleasant sound, such as an alarm, a hoot, a horn, a chime, or a bell, which may attract attention for immediate action by the driver 114. The audio warning may continue to be reproduced along with the in-vehicle alert until the driver 114 corrects a driving course of the first vehicle 102a.

In accordance with an embodiment, the ECU 108 may assess the current traffic condition of the road portion 1106, based on the determination of distance and/or relative velocity of other vehicles near the first vehicle 102a on the road portion 1106. Based on the current traffic condition, the ECU 108 may determine whether or not the first vehicle 102a should change lanes or overtake other vehicles. For instance, in case of a crowded (or dense) traffic condition, the ECU 108 may determine that the first vehicle 102a should not change lanes or overtake other vehicles. In addition, the ECU 108 may assess various adverse driving conditions associated with the road portion 1106 such as rain, poor light, night time, snow, fog, dust/hail storm, or traffic blockage (such as due to rush hour, or pedestrian rush).

In accordance with an embodiment, the ECU 108 may receive information associated with weather and driving conditions associated with a location around the road portion 1106 from the infotainment system 208. The infotainment system 208 may receive the aforementioned information from the cloud server 104, via one of the RSUs (such as the RSU 120) that may be positioned along the road portion 1106, over the wireless communication network 106. Alternatively, the ECU 108 may receive this information directly from the cloud server 104. Based on the received weather and driving condition information, the ECU 108 may assess whether the current driving condition corresponds to an adverse driving condition, as enumerated above. In accordance with an embodiment, the weather conditions may also be analyzed by use images captured by one or more of the image-capturing devices 112a to 112b in the first vehicle 102a. Based on the determined weather condition, the ECU 108 may generate distinct virtual sounds that may be reproduced by the first set of audio-output devices 226a and 226b for the driver 114. The driver 114 may then be instructed to reduce the speed of first vehicle 102a or take other suitable action. Alternatively, the distinct virtual sounds related to the weather condition may be reproduced by the second set of audio-output devices 228a to 228d for all the passengers of the first vehicle 102a.

For instance, the ECU 108 may generate an in-vehicle alert that may be reproduced for all the passengers of the first vehicle through the first sound field 902a, in case of an adverse driving condition. The in-vehicle alert may include an instruction to avoid overtaking and changing lanes. Further, the in-vehicle alert may include another instruction that may direct a reduction of speed of the first vehicle 102a such that a safe distance may be maintained from the other vehicles that travel on the road portion 1106. Apart from the in-vehicle alerts, the ECU 108 may also display messages related to the in-vehicle alerts through the display screen 210. The messages may include the weather and driving condition information received from the cloud server 104, in addition to an indication of the assessed adverse driving condition. These messages may be displayed via the infotainment system 208 of the first vehicle 102a. The messages may also be displayed on an electronic device of a user of the first vehicle 102a, in case the electronic device (such as a smartphone or a wearable device) is communicatively coupled to the infotainment system 208.

In accordance with an embodiment, the image-capturing devices 112a to 112b may be activated based on an instruction by the ECU 108 or a press of a special button. In accordance with an embodiment, when a vehicle hits the first vehicle 102a from behind, side, or front, then, instantaneously a virtual distinct sound may be produced for the driver 114 to take action immediately. The image-capturing devices 112a to 112b may capture images from various angles or appropriate side to capture specific details related to the hitting vehicle, such as a number plate, driver's photo, and/or co-passenger's photo. This information related to specific details may be used by vehicle insurance companies to verify insurance claims or by law enforcement agencies as per need.

Figure 12:
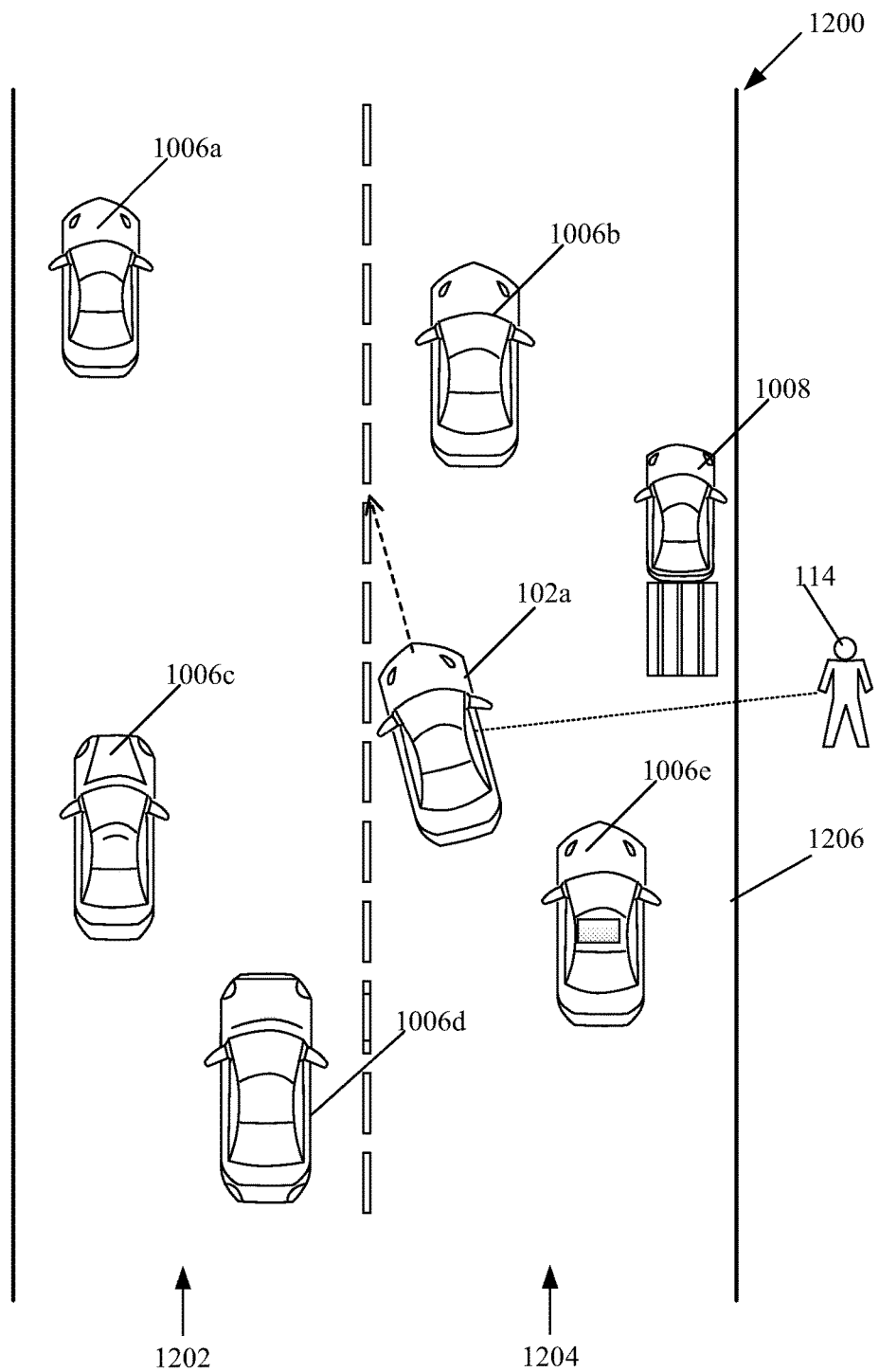
FIG. 12 illustrates a third exemplary traffic scenario to process traffic sound data to provide in-vehicle driver assistance, in accordance with an embodiment of the disclosure.

FIG. 12 illustrates a third exemplary traffic scenario to process traffic sound data to provide in-vehicle driver assistance, in accordance with an embodiment of the disclosure. FIG. 12 is explained with reference to elements from FIGS. 1 to 8, 9A, 9B, 10, and 11. With reference to FIG. 12, there is shown a top view of a third exemplary traffic scenario 1200. The third exemplary traffic scenario 1200 may include a first lane 1202 and a second lane 1204 of a road portion 1206. The third exemplary traffic scenario 1200 further includes vehicles that travel along the road portion 1206 on the first lane 1202 or the second lane 1204. The vehicles in the first lane 1202 include the second car 1006a, the fourth car 1006c, and the fifth car 1006d. Further, the vehicles in the second lane 1204 include the first vehicle 102a (such as the first car), the third car 1006b, the sixth car 1006e, and the truck 1008.

In FIG. 12, all the vehicles except the first vehicle 102a, such as cars 1006a to 1006e and the truck 1008, are shown to move in their respective lanes without changing lanes. The first vehicle 102a is shown to its change lane from the second lane 1204 to the first lane 1202. It may be evident from the third exemplary traffic scenario 1200 that the current traffic condition may correspond to a moderate traffic level. A safe driving distance may be maintained between the first vehicle 102a and the other vehicles that travel along the road portion 1206. Further, a gap between the second car 1006a and the third car 1006b, which lie in front of the first vehicle 102a on the road portion 1206, may be sufficient to accommodate the first vehicle 102a. Thus, the first vehicle 102a may be safely maneuvered between the second car 1006a and the third car 1006b, once the first vehicle 102a changes its lane to the first lane 1202. Thus, similar to the first exemplary traffic scenario 1000, it may be evident that the first vehicle 102a may be following driving rules, in this case. Further, the driving or weather conditions may also be normal in the current scenario.

In operation, the ECU 108 may determine the distance and/or relative velocity of other vehicles near the first vehicle 102a on the road portion 1206, as described above in FIGS. 4, 5, 6, 7 and 8. The ECU 108 may generate in-vehicle alert for the driver 114 of the first vehicle 102a. The in-vehicle alert may be reproduced by the first set of audio-output devices 226a and 226b in the second sound field 908a, to provide audio associated with the in-vehicle alert exclusively to the driver 114 of the first vehicle 102a. Further, the display screen 210 may display a virtual representation of the second car 1006a and the third car 1006b, as these may correspond to the vehicles that may lie within the predetermined distance from the first vehicle 102a. In addition, the display screen 210 may display a message that may recommend lane-change and guide the driver to maintain a particular speed and distance from the nearby vehicles (such as the second car 1006a and the third car 1006b).

In accordance with an embodiment, the ECU 108 may be configured to transmit the in-vehicle alert and/or audio warnings generated in the first vehicle 102a to one or more other vehicles that may be within a pre-determined proximity to the first vehicle 102a. The transmission may occur via a V2V networking infrastructure. Alternatively, the transmission may be via the wireless communication network 106, through one of the RSUs (not shown in FIG. 12) installed on the road portion 1206. In accordance with an embodiment, the in-vehicle alert and/or audio warning generated in the first vehicle 102a may be emanated as a directed sound beam towards a vehicle within pre-determined proximity of the first vehicle 102a by ECU 108. Further, in case the driver 114 of first vehicle 102a decides to overtake or change a lane, an appropriate audio message may be transmitted via a V2V communication to a desired vehicle or a directed sound beam may be beamed to the desired vehicle as an indication of overtake or change of lane.

In accordance with an embodiment, the first vehicle 102a may correspond to an autonomous vehicle, a semi-autonomous vehicle, or a non-autonomous vehicle. In instances when the first vehicle 102a is an autonomous or a semi-autonomous vehicle, driven in an automatic mode, the ECU 108 may monitor the distance and relative velocity between the other vehicles and the first vehicle 102a. The distance and the relative velocity of the other vehicles may be determined based on sound emanated from these vehicles (such as the cars 1006a to 1006e and the truck 1008), captured by the two or more audio-input devices 110a to 110d. The determination of the distance and the relative velocity is explained in FIGS. 4, 5, 6, 7, and 8. Based on the distance (and/or the relative velocity), the ECU 108 may control an automatic drive of the first vehicle 102a on the road portion 1206. Accordingly, the ECU 108 may issue instructions to the powertrain control system 214 including the steering system 216 and/or the braking system 218 to control a steering direction and/or velocity of first vehicle 102a along the road portion 1206. The instructions may be issued via the in-vehicle network 222. Further, the ECU 108 may also issue instructions indicative of a lane change command or an overtake command, based on the determined distances and/or relative velocity when the sound data is received and processed (as explained in FIGS. 4, 5, 6, 7, and 8). The issued instructions may also be sent to the powertrain control system 214, via the in-vehicle network 222. In case the first vehicle 102a is non-autonomous vehicle, the ECU 108 may provide the instructions to the driver 114, via the display screen 210, the infotainment system 208, and/or the in-vehicle alert, as already described.

Figure 13:
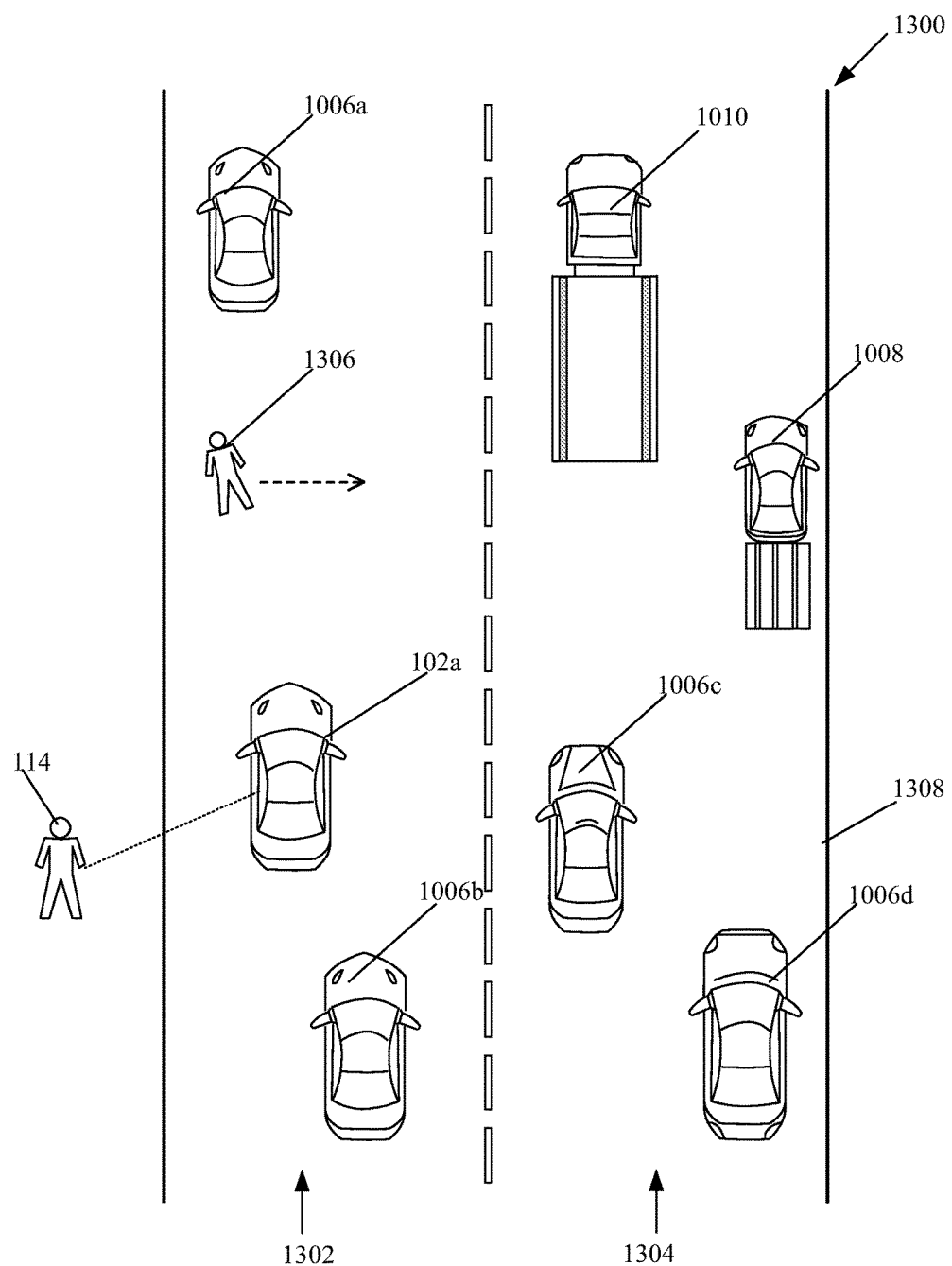
FIG. 13 illustrates a fourth exemplary traffic scenario to process traffic sound data to provide in-vehicle driver assistance, in accordance with an embodiment of the disclosure.

FIG. 13 illustrates a top view of a fourth exemplary traffic scenario to process traffic sound data to provide in-vehicle driver assistance, in accordance with an embodiment of the disclosure. FIG. 13 is explained with reference to elements from FIGS. 2, 9A, and 9B. With reference to FIG. 13, there is shown a top view of a fourth exemplary traffic scenario 1300. The fourth exemplary traffic scenario 1300 may include a first lane 1302 and a second lane 1304 of a road portion 1306. The fourth exemplary traffic scenario 1300 further includes vehicles that travel along the road portion 1306 on the first lane 1302 or the second lane 1304. The vehicles in the first lane 1302 include the first vehicle 102a (such as the first car), the second car 1006a, and the third car 1006b. Further, the vehicles in the second lane 1304 include the fourth car 1006c, the fifth car 1006d, the truck 1008, and the trailer 1010. The fourth exemplary traffic scenario 1300 further illustrates a human (such as a pedestrian 1308) who may cross the road portion 1306 from the first lane 1302 towards the second lane 1304, as depicted by the dashed line arrow in FIG. 13.

In operation, the image-capturing devices 112a to 112b (of FIG. 1; not shown in FIG. 13) of the first vehicle 102a may capture one or more images of one or more objects present in a travel path of the first vehicle 102a. The ECU 108 may detect and recognize the one or more objects based on analysis of the one or more captured images. To that end, the ECU 108 may compare the one or more images with one or more pre-stored template images associated with objects of various types stored in the memory 204. For instance, one or more objects, such as a human (for instance, the pedestrian 1308) or an animal, may be detected and recognized approaching the driving path of the driver 114 in the one or more images. Other examples of the one or more objects may include stationary or inanimate objects including, but not limited to, barricades, road-blocks, stones, stationary or parked vehicles in the path, and/or speed breakers.

In accordance with an embodiment, the ECU 108 may generate a second audio output indicative of a presence of the one or more objects in the travel path within a pre-specified distance from the first vehicle 102a. The second audio output may be included in the in-vehicle alert as an alert message. In accordance with an embodiment, the second audio output may correspond to a virtual sound that may distinctly represent the recognized object and act as a warning for the driver 114 of the first vehicle 102a. In accordance with an embodiment, the virtual sound representative of the one or more recognized objects may be generated based on pre-stored audio tracks associated with objects of various types. The amplitude, pitch, and frequency of the virtual sound may be based on the distance of the one or more objects from the first vehicle 102a and the current speed of the first vehicle 102a. For instance, in case of the pedestrian 1308, the ECU 108 may generate a virtual sound representative of the object identified as human being, as the second audio output. Accordingly, the driver 114 may reduce the speed of the first vehicle 102a and/or change driving course of the first vehicle 102a. In accordance with an embodiment, the first set of audio-output devices 226a and 226b may reproduce the second audio output for the driver of the first vehicle 102a. The second audio output may be directed exclusively towards the driver 114 in the second sound field 608a (FIG. 6B). Alternatively, the second set of audio-output devices 228a to 228d may reproduce the second audio output, through the first sound field 902, to alert all passengers of the first vehicle 102a in accordance with an extent of threat, such as a close proximity of the pedestrian 1308.

In accordance with an embodiment, the ECU 108 may also generate the second audio output in case relative velocity of another vehicle in proximity to the first vehicle 102a is beyond a predetermined threshold velocity. The ECU 108 may use audio and images captured from such other vehicles to detect the other vehicle and determine the relative velocity of the detected vehicle with respect to the first vehicle 102a. For instance, as depicted in the exemplary scenario of FIG. 13, the third car 1006b and the fourth car 1006c may lie within the predetermined proximity of the first vehicle 102a. The ECU 108 may track the movement of the third car 1006b and the fourth car 1006c based on the audio and images captured from these two vehicles. If the third car 1006b is detected as 30 km per hour faster than the first vehicle 102a, the ECU 108 may generate the second audio output indicating the speeding third car 1006b, and so on (considering the predetermined threshold velocity as 25 km per hour).

Figure 14A:
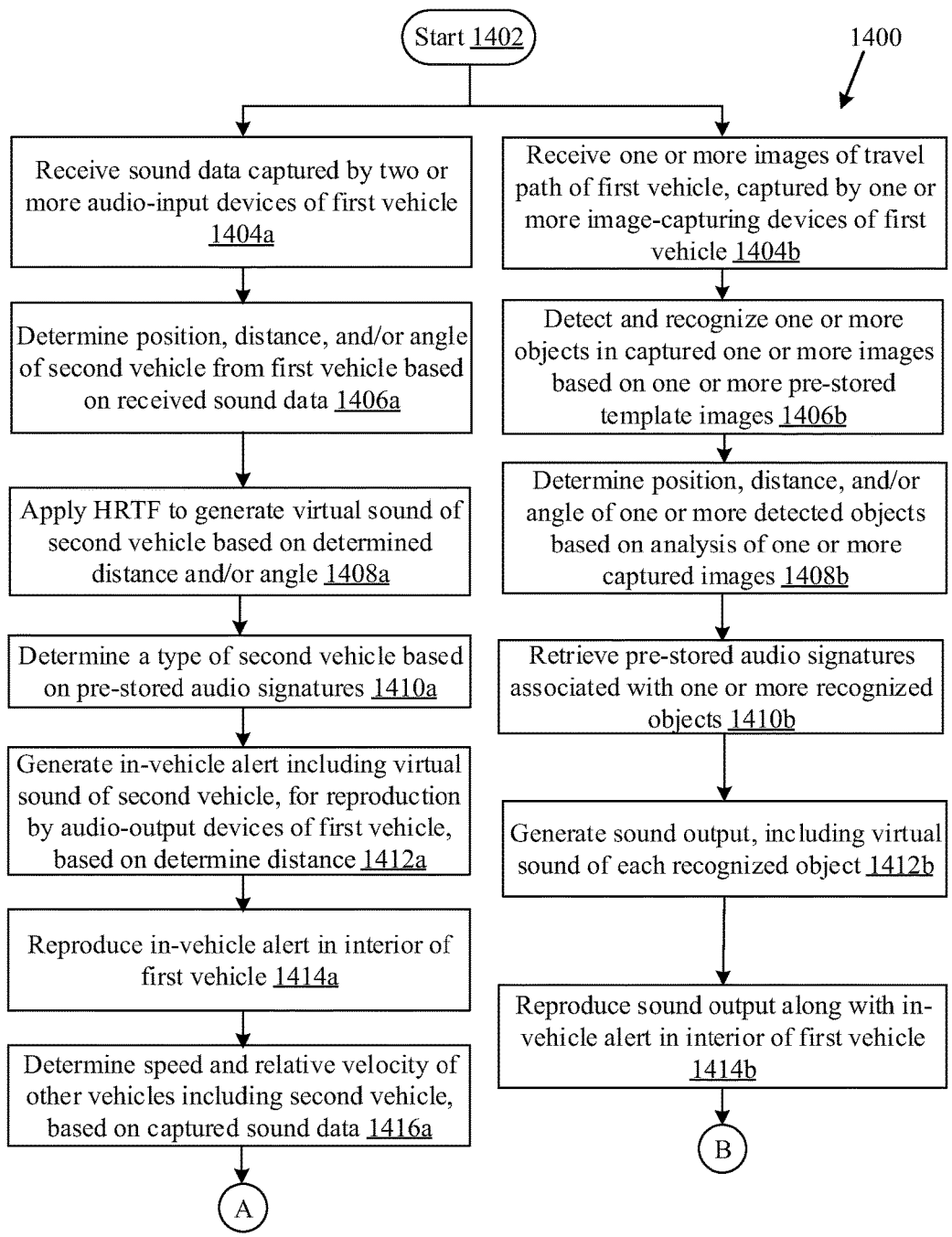
FIGS. 14A and 14B, collectively, depict a flow chart that illustrates an exemplary method to process traffic sound data to provide in-vehicle driver assistance, in accordance with an embodiment of the disclosure.
Figure 14B:
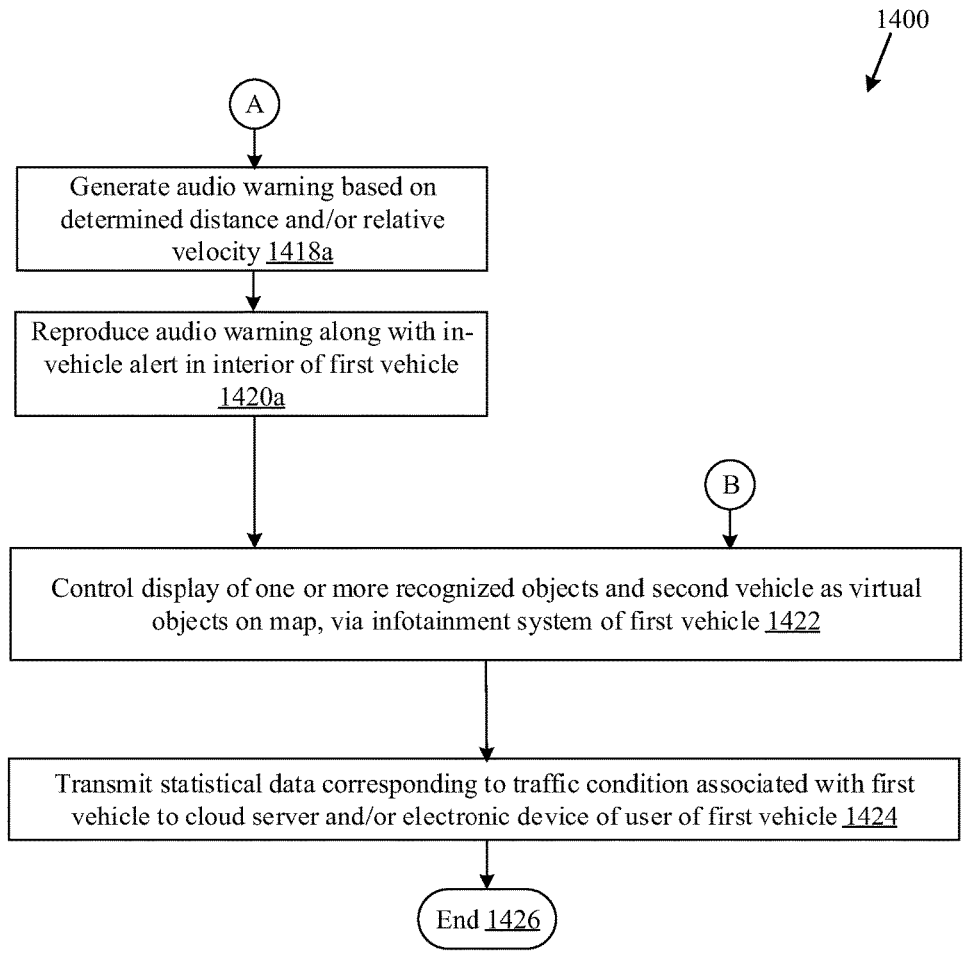

FIGS. 14A and 14B, collectively, depict a flow chart that illustrates an exemplary method to process traffic sound data to provide in-vehicle driver assistance, in accordance with an embodiment of the disclosure. With reference to FIGS. 14A and 14B, there is shown a flow chart 1400. The flow chart 1400 is described in conjunction with FIGS. 1 to 8, 9A, 9B, and 10 to 13. The method may be implemented in the ECU 108. The method starts at step 1402. Branching out from step 1402, the flow chart 1400 of the method may include two sequences of steps that may be performed in parallel with one another, or may be performed in any order, with respect to one another. The first sequence of steps includes steps 1404a to 1420a, while the second sequence of steps includes steps 1404b to 1414b. The aforementioned two sequences of steps may merge at step 1422 of the flow chart 1400, as shown in FIG. 14B.

The first sequence of steps, that is, steps 1404a to 1420a are described firstly. At step 1404a, sound data captured by the two or more audio-input devices 110 may be received. The received sound data may correspond to sound emanated from one or more other vehicles of the plurality of vehicles 102. The emanated sound may be captured by the two or more audio-input devices 110. The ECU 108 in association with the two or more audio-input devices 110a to 110h may process the captured sound by use of one or more sound filters to remove noise. Thereafter, the two or more audio-input devices 110a to 110h may generate the sound data associated with the captured sound emanated by the one or more other vehicles, which may be sent to the ECU 108 via the in-vehicle network 222. An exemplary scenario of capture of the sound emanated from the one or more other vehicles has been explained in FIGS. 3 and 6.

At step 1406a, a position, a distance, and/or an angle of the second vehicle 102b from the first vehicle 102a may be determined based on the received sound data. In accordance with an embodiment, the ECU 108 may be configured to determine the position, the distance, and/or the angle of the second vehicle 102b with respect to the first vehicle 102a, as described in the FIGS. 4, 5, 6, 7, and 8.

At step 1408a, the HRTF may be applied to generate virtual sound of second vehicle 102b based on the determined distance and/or angle. In accordance with an embodiment, the ECU 108 may be configured to apply the HRTF to generate the virtual sound of the second vehicle 102b, based on the expression 2, as explained in the FIG. 5.

At step 1410a, a vehicle type of the second vehicle 102b may be determined based on pre-stored audio signatures. In accordance with an embodiment, the ECU 108 may be configured to determine the vehicle type of the second vehicle 102b. To determine the vehicle type, the ECU 108 may apply one or more sound filters to the sound data associated with the sound captured from the second vehicle 102b. Based on the application of the one or more sound filters, the ECU 108 may determine the audio signature of the second vehicle 102b. The ECU 108 may extract pre-stored audio signatures associated with various vehicle types from the memory 204 and compare the extracted audio signatures with the determined audio signature to ascertain the vehicle type of the second vehicle 102b.

At step 1412a, an in-vehicle alert may be generated based on the determined distance of the second vehicle 102b from the first vehicle 102a. The in-vehicle alert may include the virtual sound that may be representative of sound emanated from the second vehicle 102b. In accordance with an embodiment, the ECU 108 may be configured to generate the in-vehicle alert in the first vehicle 102a by use of one or more audio-output devices of the first vehicle 102a.

In accordance with an embodiment, the in-vehicle alert may include the virtual sound of a vehicle (such as the second vehicle 102b) when that vehicle is detected within a pre-determined proximity to the first vehicle 102a. That is, when the other vehicle is within a pre-determined radius (or distance) from the first vehicle 102a, the presence of the other vehicle may be indicated via an associated virtual sound in the in-vehicle alert. The in-vehicle alert may include virtual sounds of multiple vehicles when these vehicles are detected within the pre-determined radius from the first vehicle 102a. The generation of the in-vehicle alert has been explained in the FIGS. 5, 9A, and 9B. In addition to the virtual sound, the in-vehicle alert may include an accident warning, a driving-maneuver instruction, a speed-change recommendation, a vehicle-overtake recommendation, a lane-change recommendation, driving-condition information, an obstacle warning, and/or a selected vehicle tracking.

At step 1414a, the in-vehicle alert may be reproduced in the interior of the first vehicle 102a via the first set of audio-output devices 226a and 226b of the first vehicle 102a. In accordance with an embodiment, the ECU 108 may be configured to reproduce the in-vehicle alert by use of the first set of audio-output device 226a and 226b to provide the in-vehicle alert exclusively to the driver 114, as explained in FIG. 9B. In certain scenarios, the in-vehicle alert may be reproduced for all the passengers of the first vehicle 102a via the second set of audio-output devices 228a to 228d, as explained in FIG. 9A.

At step 1416a, a speed and/or relative velocity of the one or more other vehicles including the second vehicle 102b may be determined based on the received sound data. In accordance with an embodiment, the ECU 108 may be configured to determine the speed of the one or more other vehicles based on the received sound data. Further, the ECU 108 may be further configured to determine the relative velocity of the second vehicle 102b, with respect to the first vehicle 102a. The determination of the speed of the one or more other vehicles of the plurality of vehicles 102 and the relative velocity of the second vehicle 102b has been explained in FIGS. 4, 5, 6, 7, and 8.

At step 1418a, an audio warning may be generated based on the determined distance and/or the relative velocity. In accordance with an embodiment, the ECU 108 may be configured to generate the audio warning based on the determined distance and/or the relative velocity of the second vehicle 102b with respect to the first vehicle 102a. The audio warning may be generated when the second vehicle 102b is within the pre-determined proximity of the first vehicle 102a and approaches the first vehicle 102a with a relative velocity exceeding a pre-determined threshold. The audio warning may instruct the driver 114 to slow down or maneuver the first vehicle 102a away from the second vehicle 102b. The exemplary traffic scenarios 1000 (FIG. 10), 1100 (FIG. 11), 1200 (FIG. 12), and 1300 (FIG. 13) present various examples of the reproduction of in-vehicle alerts and/or warnings in various traffic and driving conditions.

At step 1420*a*, the audio warning may be reproduced along with the in-vehicle alert in the interior of the first vehicle 102*a*. In accordance with an embodiment, the ECU 108 may be configured to reproduce the audio warning along with the in-vehicle alert. The audio warning may be reproduced via the first set of audio-output devices 226*a* and 226*b* directed towards the driver 114. Alternatively, the second set of audio-output devices 228*a* to 228*d* may reproduce the audio warning to all the passengers of the first vehicle 102*a*. From step 1420*a* of the first sequence of steps, control passes to step 1422. The step 1422 is described after the second sequence of steps, that is, steps 1404*b* to 1414*b*, given below.

At step 1404*b*, one or more images of the travel path of the first vehicle 102*a* are received. The one or more images may be captured by the one or more of the image-capturing devices 112*a* to 112*b* of the first vehicle 102*a*. The one or more images may include one or more vehicles and/or objects in a field of view of the one or more of the image-capturing devices 112*a* to 112*b*. The image-capturing devices 112*a* to 112*b* may send the one or more images to the ECU 108 for further processing, analysis, via the in-vehicle network 222.

At step 1406*b*, the one or more objects in the one or more captured images may be detected and recognized. In accordance with an embodiment, the ECU 108 may be configured to analyze the one or more images by use of one or more image processing techniques, based on one or more pre-stored template images in memory 204. The one or more pre-stored template images may be associated with objects of one or more known object types. Based on the analysis, the ECU 108 may detect or recognize the one or more objects from the one or more images. Further, the ECU 108 may determine an object type of each recognized object based on the analysis of the one or more captured images, based on the one or more pre-stored template images.

At step 1408*b*, a position, a distance, and/or an angle of the one or more detected objects from the first vehicle 102*a* may be determined. In accordance with an embodiment, the ECU 108 may be configured to determine the position, the distance, and/or the angle of the one or more detected objects. The determination of the position, the distance, and/or the angle of the one or more detected objects may be performed by use of one or more image processing techniques and one or more triangulation techniques applied on the one or more captured images. In accordance with an embodiment, one or more sensors of the sensing system 220, may be used for the determination of the position, the distance, and/or the angle of the one or more detected objects in addition to the one or more image processing techniques.

At step 1410*b*, pre-stored audio signatures associated with the one or more recognized objects may be retrieved. In accordance with an embodiment, the ECU 108 may extract pre-stored audio signatures associated with various object types from the memory 204. Further, the ECU 108 may compare the object type determined for each of the one or more recognized objects with the object types associated with the extracted pre-stored audio signatures. Based on the comparison, the ECU 108 may assign relevant audio signatures to the one or more recognized objects of the various object types.

At step 1412*b*, a sound output, which may include virtual sound of each recognized object, may be generated. In accordance with an embodiment, the ECU 108 may be configured to generate the sound output, which may indicate a presence of the one or more objects within a pre-specified distance of the first vehicle 102*a*. The virtual sound of each recognized object may be generated based on the object type and/or the distance of that object from the first vehicle 102*a*. In accordance with an embodiment, the audio signature assigned to the each recognized object may be used to generate a distinct virtual sound output representative of each recognized detected object, based upon the object type of that object. In accordance with an embodiment, the virtual sound output associated with a recognized object may include a sound effect rendered to indicate a presence of that object in the travel path. For instance, a specific sound associated with an animal, such as cattle, may be rendered to indicate presence of the cattle in the travel path of the first vehicle 102*a*. Further, another sound, such as a pre-recorded human voice, may be rendered to indicate presence of the human, such as the pedestrian 1008, in the travel path along a road portion. Thus, each object, such as a human, or an animal, may be distinctly identifiable in the sound output due to reproduction of virtual sound that mimics natural sound usually made by such recognized object in real-world.

At step 1414*b*, the sound output may be reproduced along with the in-vehicle alert in the interior of the first vehicle 102*a*. In accordance with an embodiment, the ECU 108 may reproduce the sound output via the first set of audio-output devices 226*a* and 226*b* for the driver 114 of the first vehicle 102*a*. Alternatively, the sound output may be reproduced for all the passengers of the first vehicle 102*a*, via the second set of audio-output devices 228*a* to 228*d*. The sound output either may be mixed with another sound output of the in-vehicle alert or may be played back separately. From step 1414*b* of the second sequence of steps, control passes to step 1422.

At step 1422, display of the recognized one or more objects and the second vehicle 102*b* as virtual objects may be controlled. The display may be controlled on a map rendered via the infotainment system 208 of the first vehicle 102*a*. The ECU 108 may be configured to control the display of the one or more objects and second vehicle 102*b* as virtual objects on the map, via the infotainment system 208. The display of the virtual objects that represent the recognized one or more objects and the second vehicle 102*b* may be controlled based on the respective determined distances based on received sound data and/or their recognition in the one or more captured images.

At step 1424, statistical data that may correspond to a traffic condition associated with the first vehicle 102*a*, may be transmitted to the cloud server 104 and/or an electronic device (such as a smartphone, a wearable device, or an Internet-of-Things device) of a user of first vehicle 102*a*. The ECU 108 may be further configured to compile statistical data corresponding to traffic condition in a traffic area associated with the first vehicle 102*a*. In accordance with an embodiment, the ECU 108 may transmit the compiled information corresponding to the traffic condition to a traffic management server (such as the cloud server 104) and/or the electronic device. The electronic device may belong to a user of the first vehicle 102*a* or other pre-registered user. The transmission of the traffic condition information may be based on the determined distance, the relative velocity, and/or the type of the second vehicle 102*b*. The transmission of the traffic condition information may be further based on a count of the one or more other vehicles within a pre-determined distance from the first vehicle 102*a*. The statistical data may be transmitted via the wireless communication network 106, through one of the RSUs (such as the RSU 120) to the cloud server 104. Alternatively, the statistical data may be directly transmitted to the cloud server 104, via the wireless communication network 106. The control may pass to end step 1426.

In accordance with an embodiment of the disclosure, a system to process traffic sound data to provide in-vehicle driver assistance is disclosed. The system (such as the ECU 108 (FIG. 1) of the first vehicle 102a (FIG. 1)) may comprise one or more circuits (hereinafter referred to as the microprocessor 202 (FIG. 2)). The microprocessor 202 may be configured to receive sound data captured by the two or more audio-input devices 110a to 110h (FIG. 1). The sound data may correspond to sound emanated from one or more other vehicles that may include the second vehicle 102b (FIG. 1). The microprocessor 202 may be configured to determine a distance of the first vehicle 102a from the second vehicle 102b based on the received sound data. Further, the microprocessor 202 may be configured to generate an in-vehicle alert based on the determined distance. The in-vehicle alert may comprise a virtual sound representative of sound emanated from the second vehicle 102b.

In accordance with another aspect of the disclosure, an embodiment of a vehicle is disclosed. Exemplary aspects of the disclosed vehicle (such as the first vehicle 102a (FIG. 2)) may comprise a vehicle body (such as the vehicle body 230 (FIG. 2)), two or more audio-input devices 110a to 110h (FIG. 1) mounted on the vehicle body 230, and the ECU 108 (FIG. 2). The ECU 108 may include one or more circuits that may be configured to receive sound data captured by the two or more audio-input devices 110a to 110h. The sound data may correspond to sound emanated from one or more other vehicles. Thereafter, a distance of the first vehicle 102a from at least one of the one or more other vehicles may be determined based on the received sound data. Further, an in-vehicle alert may be generated for the first vehicle 102a based on the determined distance. The in-vehicle alert may include a virtual sound representative of sound emanated from the at least one of the one or more other vehicles.

Various embodiments of the disclosure may provide a non-transitory computer readable medium and/or storage medium, having stored thereon, a set of computer-executable instructions to cause a machine and/or a computer to process traffic sound data to provide in-vehicle driver assistance. The set of computer-executable instructions in an ECU, such as the ECU 108 (FIG. 1), may cause the machine and/or computer to perform the steps that comprise the receipt of sound data captured by the two or more audio-input devices 110a to 110h (FIG. 1). The sound data may correspond to sound emanated from one or more other vehicles that may include the second vehicle 102b (FIG. 1). A distance of the first vehicle 102a from the second vehicle 102b may be determined based on the received sound data. An in-vehicle alert may be generated for the first vehicle 102a based on the determined distance. The in-vehicle alert may comprise a virtual sound representative of sound emanated from the second vehicle 102b.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for in-vehicle driver assistance, comprising:
one or more circuits in an electronic control unit (ECU) of a first vehicle, wherein said one or more circuits are configured to:
    receive sound data captured by a plurality of audio-input devices associated with said first vehicle, wherein
        said sound data corresponds to first sound emanated from at least one second vehicle, and
        said at least one second vehicle is different from said first vehicle;
    determine, based on said sound data, a first distance of said first vehicle from said at least one second vehicle;
    generate, via a first set of audio-output devices associated with a driver of said first vehicle, an in-vehicle alert for said first vehicle based on said determined first distance,
    wherein said in-vehicle alert comprises a virtual sound representative of second sound emanated from said at least one second vehicle; and
    reproduce, through a second set of audio-output devices associated with at least one co-passenger of said first vehicle, said in-vehicle alert based on a traffic condition associated with a travel path of said first vehicle.

2. The system according to claim 1, wherein said in-vehicle alert includes at least one of an accident warning, a driving-maneuver instruction, a speed-change recommendation, a vehicle-overtake recommendation, a lane-change recommendation, driving-condition information, an obstacle warning, or a selected vehicle tracking.

3. The system according to claim 1, wherein said one or more circuits are further configured to:
    determine at least one of a position of said at least one second vehicle or an angle of said at least one second vehicle with respect to said first vehicle based on said sound data; and reproduce said virtual sound in said first vehicle based on said at least one of said position or said angle.

4. The system according to claim 3, wherein
said one or more circuits are further configured to apply a Head-Related Transfer Function (HRTF) based on at least one of said first distance or said angle,
said reproduction of said virtual sound is based on said HRTF.

5. The system according to claim 1, wherein said one or more circuits are further configured to determine a type of said at least one second vehicle based on comparison of a specific audio signature associated with said at least one second vehicle and said second sound.

6. The system according to claim 5, wherein said virtual sound is reproduced based on at least one of said first distance that is less than a threshold distance or a relative velocity of said at least one second vehicle with respect to said first vehicle that is greater than a threshold velocity.

7. The system according to claim 1, wherein said one or more circuits are further configured to determine speed of said at least one second vehicle based on said first sound.

8. The system according to claim 1, wherein said one or more circuits are further configured to:
determine a relative velocity of said at least one second vehicle with respect to said first vehicle based on said second sound; and
generate an audio warning, along with said virtual sound, in said first vehicle based on at least one of said first distance or said relative velocity.

9. The system according to claim 1,
wherein said one or more circuits are further configured to:
control at least one image-capturing device to capture at least one image of at least one object present in said travel path of said first vehicle, and
determine a second distance of said at least one object from said first vehicle based on said at least one image.

10. The system according to claim 9, wherein said one or more circuits are further configured to recognize said at least one object based on said captured at least one image of said at least one object.

11. The system according to claim 9, wherein said in-vehicle alert further includes a third sound indicative of a presence of said at least one object within a specific distance from said first vehicle.

12. The system according to claim 11, wherein said one or more circuits are further configured to control, based on said captured at least one image, a display screen of an infotainment system of said first vehicle to display a virtual object representative of said at least one object.

13. The system according to claim 11, wherein said one or more circuits are further configured to control, based on said at least one image and said first distance, a display screen of an infotainment system of said first vehicle to display said at least one second vehicle on a map.

14. The system according to claim 13, wherein said one or more circuits are further configured to:
track a relative position of a specific vehicle with respect to said first vehicle, based on at least one of a fourth sound emanated from said specific vehicle or at least one image of said specific vehicle,
wherein said specific vehicle is a user selected vehicle of said at least one second vehicle based on a user selection on a user interface of said infotainment system of said first vehicle; and
generate at least one of said in-vehicle alert or said display of said map.

15. The system according to claim 1, wherein said one or more circuits are further configured to transmit information corresponding to said traffic condition associated with said travel path of said first vehicle to at least one of a traffic management server or a user electronic device, based on at least one of said first distance, a relative velocity of said at least one second vehicle with respect to said first vehicle, a type of said at least one second vehicle, or a count of said at least one second vehicle within a specific distance from said first vehicle.

16. The system according to claim 1, wherein said one or more circuits are further configured to switch said in-vehicle alert from a first sound field in said first vehicle to a second sound field in said first vehicle.

17. The system according to claim 1, wherein a time of arrival of said sound data at said first vehicle is inversely proportional to a third distance of said at least one second vehicle from a respective one of said plurality of audio-input devices associated with said first vehicle.

18. A method for in-vehicle driver assistance, said method comprising:
in an electronic control unit (ECU) of a first vehicle:
receiving sound data captured by a plurality of audio-input devices associated with said first vehicle, wherein
said sound data corresponds to first sound emanated from at least one second vehicle, and
said at least one second vehicle is different from said first vehicle;
determining, based on said sound data, a distance of said first vehicle from said at least one second vehicle;
generating, via a first set of audio-output devices associated with a driver of said first vehicle, an in-vehicle alert in said first vehicle based on said distance, wherein said in-vehicle alert includes a virtual sound representative of second sound emanated from said at least one second vehicle; and
reproducing, through a second set of audio-output devices associated with at least one co-passenger of said first vehicle, said in-vehicle alert based on a traffic condition associated with a travel path of said first vehicle.

19. The method according to claim 18, further comprising:
determining, by said ECU, at least one of a position of said at least one second vehicle or an angle of said at least one second vehicle with respect to said first vehicle based on said sound data; and
reproducing said virtual sound in said first vehicle based on said determined at least one of said position or said angle.

20. A first vehicle, comprising:
a vehicle body;
a plurality of audio-input devices on said vehicle body;
a first set of audio-output devices associated with a driver of said first vehicle and a second set of audio-output devices associated with at least one co-passenger of said first vehicle; and
an electronic control unit (ECU) including one or more circuits configured to:
receive sound data captured by said plurality of audio-input devices, wherein
said sound data corresponds to first sound emanated from at least one second vehicle, said at least one second vehicle is different from said first vehicle;

determine, based on said sound data, a distance of said first vehicle from said at least one second vehicle;

generate, via said first set of audio-output devices, an in-vehicle alert in said first vehicle based on said determined distance, wherein said in-vehicle alert includes a virtual sound representative of second sound emanated from said at least one second vehicle; and reproduce, through said second set of audio-output devices associated with said at least one co-passenger of said first vehicle, said in-vehicle alert based on a traffic condition associated with a travel path of said first vehicle.

* * * * *